(12) United States Patent
Kennedy

(10) Patent No.: US 8,893,868 B2
(45) Date of Patent: Nov. 25, 2014

(54) CLUTCH ASSEMBLY

(75) Inventor: Lawrence C. Kennedy, Commerce Township, MI (US)

(73) Assignees: Mahle Behr USA Inc., Troy, MI (US); General Motors Corporation, Detroit, MI (US)

( * ) Notice: Subject to any disclaimer, the term of this patent is extended or adjusted under 35 U.S.C. 154(b) by 84 days.

(21) Appl. No.: 13/032,381

(22) Filed: Feb. 22, 2011

(65) Prior Publication Data

US 2011/0278122 A1 Nov. 17, 2011

Related U.S. Application Data

(62) Division of application No. 10/594,319, filed as application No. PCT/US2005/011346 on Apr. 1, 2005.

(60) Provisional application No. 60/558,140, filed on Apr. 1, 2004.

(51) Int. Cl.
*F16D 35/00* (2006.01)
*F16D 37/02* (2006.01)
*F16D 37/00* (2006.01)

(52) U.S. Cl.
CPC .......... *F16D 37/02* (2013.01); *F16D 2037/002* (2013.01)
USPC ....................................... 192/21.5; 192/58.4

(58) Field of Classification Search
USPC ............................... 192/21.5, 58.4; 188/267.1
See application file for complete search history.

(56) References Cited

U.S. PATENT DOCUMENTS

| 2,525,571 | A | | 10/1950 | Winther |
| 2,587,077 | A | | 2/1952 | Winther |
| 2,713,927 | A | * | 7/1955 | Rabinow ..................... 192/21.5 |
| 2,717,023 | A | * | 9/1955 | Hetherington ............... 277/500 |
| 2,745,527 | A | | 5/1956 | Winther |

(Continued)

FOREIGN PATENT DOCUMENTS

| CH | 329848 | 5/1958 |
| CH | 331642 | 7/1958 |
| JP | 57094134 A | 6/1982 |

OTHER PUBLICATIONS

International Search Report mailed Nov. 17, 2005 in International Application No. PCT/US2005/011345 (4 pgs.).

(Continued)

*Primary Examiner* — Gene Crawford
*Assistant Examiner* — Terry Chau
(74) *Attorney, Agent, or Firm* — Foley & Lardner LLP

(57) ABSTRACT

A viscous fluid clutch for use as a clutch for a cooling fan for a vehicle, the clutch includes an input shaft, a rotor assembly, a first housing portion, a second housing portion, a coil assembly, and a brush box. The rotor assembly is coupled to the input shaft. The first housing portion is coupled to the second housing portion and the second housing portion is rotatably disposed on the input shaft. The first and second housing portions define a fluid reservoir for receiving the rotor assembly and a viscous fluid, preferably of the magnetorheological type. The coil assembly is coupled to the first housing portion. The brush box is operably coupled to the coil assembly. When the coil assembly is energized by the brush box, a magnetic field is created that acts upon the magnetorheological fluid to vary the torque transfer of the input shaft to the housing and the fan connected thereto.

13 Claims, 25 Drawing Sheets

(56) References Cited

U.S. PATENT DOCUMENTS

| | | | |
|---|---|---|---|
| 2,822,070 A | 2/1958 | Jaeschke | |
| 2,870,888 A | 1/1959 | Gill, Jr. | |
| 2,921,658 A | 1/1960 | Forster | |
| 3,086,631 A * | 4/1963 | Imperi | 192/21.5 |
| 3,176,809 A | 4/1965 | Monroe | |
| 3,917,041 A | 11/1975 | Walberg | |
| 4,432,444 A | 2/1984 | Hauser | |
| 4,739,864 A | 4/1988 | Numazawa et al. | |
| 4,788,885 A | 12/1988 | Fries | |
| 5,178,582 A | 1/1993 | Maji et al. | |
| 5,429,173 A | 7/1995 | Wang et al. | |
| 5,598,908 A | 2/1997 | York et al. | |
| 5,803,219 A | 9/1998 | Ogawa | |
| 5,823,309 A | 10/1998 | Gopalswamy et al. | |
| 5,845,752 A | 12/1998 | Gopalswamy et al. | |
| 5,848,678 A | 12/1998 | Johnston et al. | |
| 5,896,964 A | 4/1999 | Johnston et al. | |
| 5,896,965 A | 4/1999 | Gopalswamy et al. | |
| 5,960,918 A | 10/1999 | Moser et al. | |
| 6,032,772 A | 3/2000 | Moser et al. | |
| 6,102,177 A | 8/2000 | Moser et al. | |
| 6,173,823 B1 | 1/2001 | Moser et al. | |
| 6,318,531 B1 | 11/2001 | Usoro et al. | |
| 6,371,267 B1 | 4/2002 | Kao et al. | |
| 6,450,691 B1 | 9/2002 | Okuma et al. | |
| 6,585,092 B1 | 7/2003 | Smith et al. | |
| 7,690,487 B2 | 4/2010 | Boddy | |
| 2001/0021285 A1 | 9/2001 | Nakamura | |
| 2003/0111312 A1 | 6/2003 | Stretch | |
| 2006/0254871 A1 | 11/2006 | Murty et al. | |

OTHER PUBLICATIONS

International Search Report mailed Oct. 21, 2005 in International Application No. PCT/US2005/011346 (5 pgs.).
Office Action mailed Jun. 7, 2012 in related U.S. Appl. No. 10/594,315 (17 pages).
Office Action mailed Nov. 2, 2012 in related U.S. Appl. No. 13/217,507 (18 pgs.).
Office Action mailed Nov. 15, 2012 in related U.S. Appl. No. 10/594,315 (19 pgs.).
Office Action mailed Oct. 11, 2012 in related U.S. Appl. No. 13/052,738 (18 pgs.).
Office action mailed Dec. 4, 2013 in co-pending U.S. Appl. No. 13/052,738 (14 pgs.).
Office action mailed Dec. 13, 2013 in co-pending U.S. Appl. No 10/594,319 (18 pgs.).
Final Office Action mailed Jun. 12, 2014 in co-pending U.S. Appl. No. 13/052,738 (18 pgs.).
Final Office Action mailed Jul. 7, 2014 in co-pending U.S. Appl. No. 10/594,319 (14 pgs.).

\* cited by examiner

CLUTCH ASSEMBLY

The present application claims the benefit of, and priority to, U.S. Provisional Patent Application No. 60/558,140, filed Apr. 1, 2004; and is a Divisional of U.S. Utility patent application Ser. No. 10/594,319, filed Apr. 3, 2007, which is a U.S. National Stage entry of International Application No. PCT/US2005/011346, filed Apr. 1, 2005.

BACKGROUND

The present invention relates to a clutch assembly. More particularly, the present invention relates to a more robust and readily manufacturable viscous fluid clutch (e.g., a magnetorheological (MRF) fluid clutch) for a fan drive assembly for use in a vehicle.

A viscous fluid clutch typically includes a viscous material, such as a magnetorheological fluid, operating in a gap between a driven rotor and a stator where the stator couples with the rotor to drive an output speed of the clutch and an attached fan blade assembly. Magnetorheological fluids typically include finely divided iron particles suspended in a non-polar medium. Magnetorheological fluids are preferably formulated to resist particle separation even under high separation force applications and typically function as Bingham fluids. In an ambient gravitational field and in the absence of a magnetic field, a Bingham fluid displays a shear stress that increases generally linearly as the shear rate on the fluid is increased. When a Bingham fluid is subjected to a magnetic field, the shear stress versus shear rate relationship is increased so that substantially more shear stress is required to commence shear of the fluid. Such a characteristic is useful in controlling transfer of torque between the rotor and the stator in an MRF clutch.

The known design of a viscous fluid clutch further includes a coil for creating an electromagnetic field in gaps between the rotor and the stator. When the magnetorheological fluid is subjected to the magnetic field, the yield stress of the magnetorheological fluid varies and the degree to which the stator is coupled to the rotor varies. In this manner, the output speed of the clutch is infinitely variable with respect to the input speed within the control range of the device.

In an engine driven fan system employing an MRF clutch, the speed of the fan is continuously variable by varying a magnetic flux density in the magnetorheological fluid. Such variable speed fan drive assemblies provide improved fuel economy, noise reduction, improved power train cooling, and cost reduction. However, conventional MRF clutches can involve excessive manufacturing cost and labor.

For example, in practice, all fan clutches, including conventional MRF clutches, have typically required the use of four or more fasteners to attach a fan blade hub to a fan cover body. The greater the number of fasteners, the greater the weight and cost of the final product and the more time required for manufacturing assembly.

Conventional MRF clutches also include a rotor having a slot, or a series of discontinuous slots (or other feature), to prevent the magnetic field from prematurely shunting across the rotor. The creation of the slots (or other shunt prevention feature) requires the rotor to undergo a complex additional machining process, which increases manufacturing cost and time.

Another disadvantage of conventional MRF clutches is that such clutches have proven to not be sufficiently robust for application in vehicles. For example, such clutches may include leak paths that enable the magnetorheological fluid to escape from the clutch as the MRF seeps into an internal porous portion of the cast aluminum fan cover body. Although the shell (or skin) of the casting generally prevents the fluid from leaking beyond the internal porous portion of the casting, bolt holes for attachment of the fan blade hub include machined threads. The machining process breaches the shell of the casting (which is created during the casting process) to expose the internal porous portion thereby providing a leak path for the escape of the magnetorheological fluid. Similarly, magnetorheological fluid can leak out of the clutch along a path formed by areas of contact between the cast fan cover body and a metal fan cover insert.

Additionally, in conventional MRF clutches, problems may arise during clutch operation. For example, in such clutches the clutch cover is typically positioned around a ferrous material cover insert. During operation of the clutch, the clutch cover and the clutch cover insert may tend to separate. Similarly, the rotor hub of such clutches may experience dimensional changes due to increased temperature during clutch operation. The dimensional changes can cause the rotor hub (and/or the rotor, which is attached to the rotor hub) to contact the clutch housing during operation.

MRF clutches typically generate a significant amount of heat due to viscous heating and are susceptible to damage from overheating. One disadvantage of conventional MRF fan clutches is that such clutches typically rely solely on incoming air flow (i.e., ram air) to cool the clutch. The ram air is generated by motion of the vehicle. When vehicle speed is low (e.g., at engine idle, during severe grade towing, travel with a significant tailwind), the velocity and volume of ram air flowing over the clutch may be insufficient to effectively cool the clutch. The velocity and volume of ram air reaching the fan clutch is also is also affected by restrictions to the free flow of incoming air, such as the vehicle front end, the radiator, the grille assembly, and the hood latch mechanism.

Additionally, conventional MRF clutches do not effectively direct the ram air to the cooling fins of the clutch. Due to clutch geometry, air flowing toward the clutch may stagnate or bypass the cooling fins so that heat is not effectively dissipated. For example, such clutches typically have an electrical cap connected to the fan clutch at a central area on the front of the clutch. The electrical cap creates a stagnation point so that heat cannot be effectively dissipated from the central area of the clutch. As a result, performance and overall durability of the clutch are reduced.

In a vehicle system, an MRF fan clutch is typically driven by the same pulley that drives the water pump. For example, a drive belt from the crankshaft pulley turns a water pump pulley, which drives both the water pump and the fan clutch. One disadvantage of such an arrangement is that the water pump and the fan clutch generally require different input speeds. Thus, the fan clutch must be stepped-up using an appropriate gear (pulley) device so that the input shaft of the fan clutch rotates at a proportionately higher speed than engine speed. Selection of the pulley ratio of the gear device requires a compromise between fan speed and water pump speed. If the ratio is too high, the fan speed may be excessive even though the water pump speed satisfies the demand for coolant flow. Excessive fan speed can cause premature failure of the fan clutch. Conversely, if the ratio is too low, the fan speed will provide insufficient airflow to the coolant flowing through the radiator resulting in diminished air conditioning performance at idle.

BRIEF DESCRIPTION OF THE DRAWINGS

The accompanying drawings, which are herein incorporated and constitute a part of this specification, illustrate embodiments of the invention and together with the description serve to explain principles of the invention.

DETAILED DESCRIPTION OF PREFERRED EMBODIMENTS

As background, MRF clutches are described in U.S. Pat. Nos. 5,823,309; 5,845,752; 5,848,678; 5,896,964; 5,896,965; 5,960,918; 6,032,772; 6,102,177; 6,173,823; 6,318,531; and 6,585,092. The entire disclosure of each of these patents are herein incorporated by reference.

Figure 1:
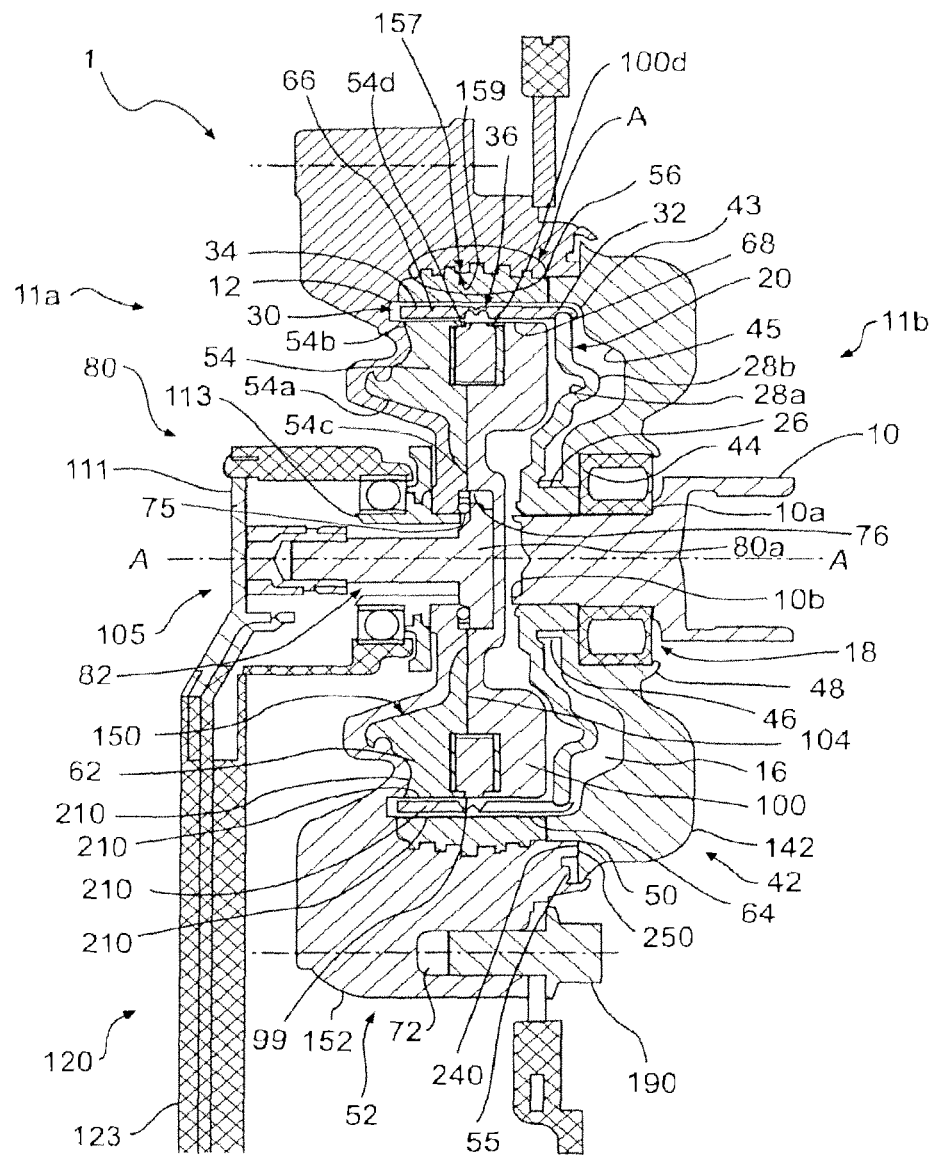
FIG. 1 is a cross sectional side elevation view of an embodiment of a clutch assembly according to the present invention.

FIG. 1 shows an embodiment of a magnetorheological fluid (MRF) clutch 1 for a fan drive assembly according to an embodiment of the present invention. In this embodiment, the MRF clutch 1 generally includes an input shaft 10, a rotor hub 20, a rotor 30, a clutch housing assembly 40, a coil assembly 80, and a tether assembly 120.

The input shaft 10 (shown in FIG. 1) is configured to supply rotational input force to the MRF clutch 1. The input shaft 10 rotates about an axis A-A and can be driven by an engine of a vehicle, for example, using a pulley driven by a crankshaft or other input device. Accordingly, a speed of the input shaft 10 is engine speed or is stepped-up using an appropriate gear device to make the input shaft 10 rotate at a proportionately higher speed than the engine speed. The input shaft 10 can be made, for example, of metal, such as a high carbon steel, or any other known or appropriate material.

Figure 2:
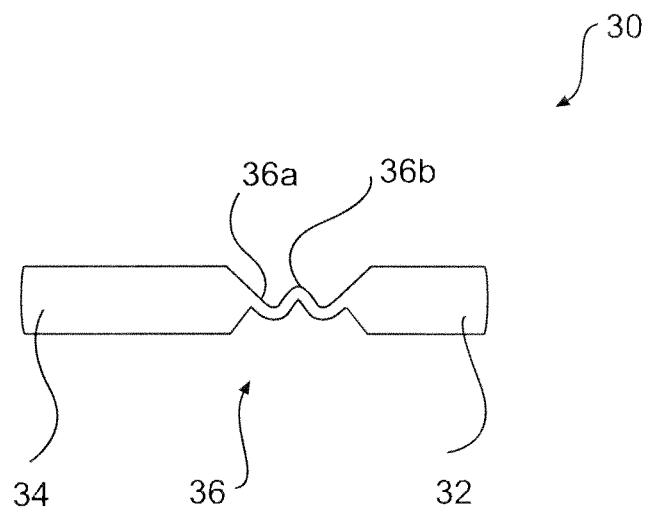
FIG. 2 is a cross sectional side view of a rotor of FIG. 1.
Figure 2A:
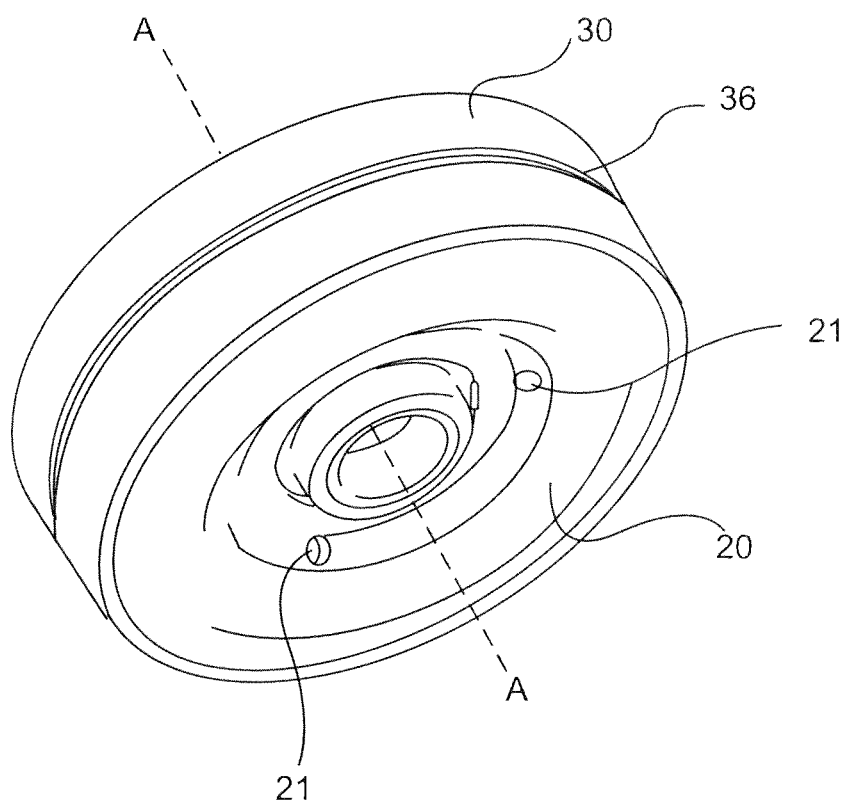
FIG. 2A is a perspective view of the rotor and a rotor hub of FIG. 1.
Figure 2B:
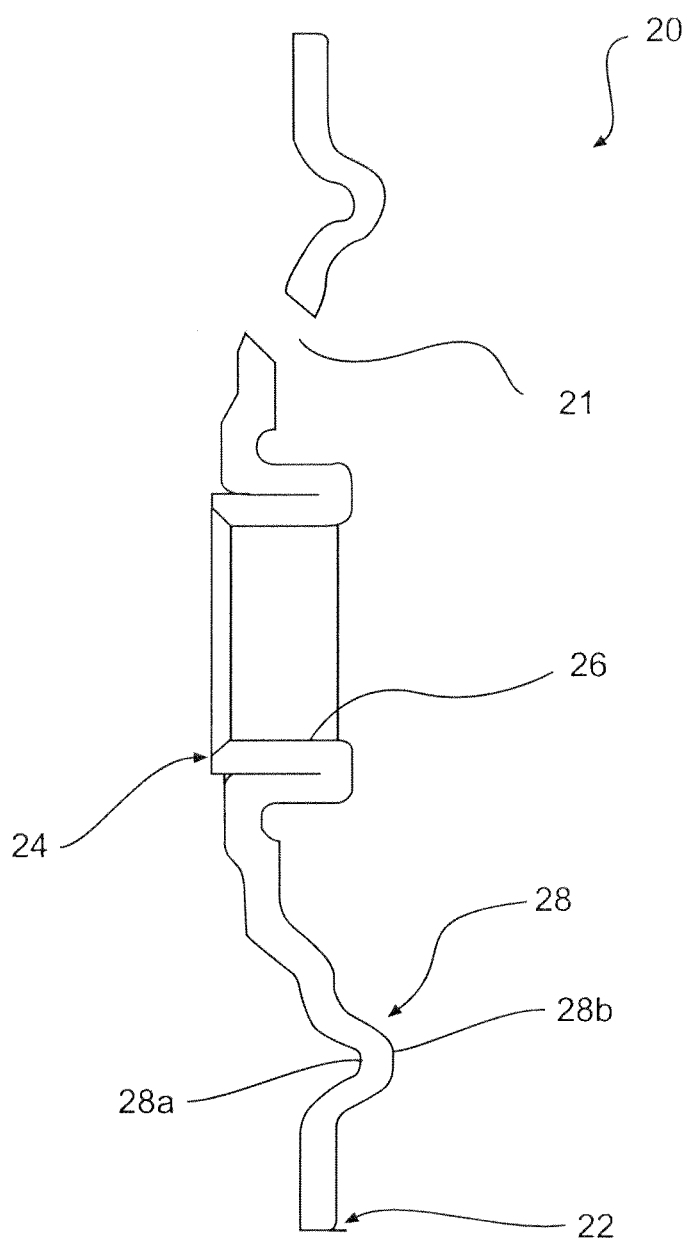
FIG. 2B is a cross sectional side view of the rotor hub of FIG. 1.

The MRF clutch 1 includes a rotor hub 20 configured to receive rotational input force from the input shaft 10. As shown in FIGS. 2A and 2B, the rotor hub 20 preferably has an annular shape with an outer periphery 22 and an inner periphery 24. As shown in FIG. 2A, the annular shape of the rotor hub 20 is substantially round (or circular) for rotation about a center axis, such as the axis of rotation A-A of the input shaft 10. The inner periphery 24 of the rotor hub 20 includes a annular neck 26 affixed to the input shaft 10. The rotor hub 20 extends radially outward from the input shaft 10, and the outer periphery 22 of the rotor hub 20 is connected to an end of the rotor 30. The rotor hub 20 can be made from any known method but is preferably stamped from a non-magnetic metal, such as aluminum.

The rotor hub 20 can optionally include a plurality of holes 23 to reduce the weight of the rotor hub 20, to balance pressure on each side of the rotor hub 20, and/or to allow for the circulation of the magnetorheological fluid or gas. The holes 23 can be disposed proximate outer periphery 22 of rotor hub 20 and can be, for example, equally spaced with each hole 23 having a diameter of approximately 5 mm to 7 mm. The rotor hub 20 can also optionally include breathing passages 21 in the form of several holes radially and angularly spaced about the rotor hub 20 to equalize pressure on both sides of the rotor hub 20 and to allow for the circulation of air. The breathing passages can be disposed near a center of the rotor hub 20 (as shown in FIG. 2A) so that the breathing passages 21 are outside a shear zone of the magnetorheological fluid. The breathing passages 21 can be, for example, equally spaced with each breathing passage 21 having a diameter of approximately 5 mm to 7 mm. The circulation of gas and/or magnetorheological fluid through rotor hub 20 improves heat transfer and thereby allows the magnetorheological fluid to be more easily cooled.

The rotor hub 20 can also include a formed (curved) portion 28 (shown in FIG. 2B) extending annularly around the rotor hub 20. The formed portion 28 is disposed between the outer periphery 22 and the inner periphery 24 of the rotor hub 20. The formed portion 28 is configured to compensate for dimensional changes of the rotor hub 20 due to temperature variation during operation of the MRF clutch 1 by preventing radial movement of the outer periphery 22 of the rotor hub 20. For example, the formed portion 28 can include a concave surface 28a and a convex surface 28b. As shown in FIG. 1, the concave surface 28a is disposed on the side of the rotor hub 20 facing toward a direction of extension of the rotor 30 (e.g., toward a fan cover body 52). The convex surface 28b is disposed on the opposite side of the rotor hub 20, that is, on the side of the rotor hub 20 facing a direction that is opposite the direction of extension of the rotor 30 (i.e., facing toward a housing 42). Additionally, the concave surface 28a and the convex surface 28b are offset from the outer periphery 22 in a direction along the axis of rotation A-A of the input shaft 10 toward the housing 42. A radius of curvature of the concave surface 28a can be, for example, approximately 1.55 mm. Provision of the formed portion 28 provides a space (i.e., the space adjacent the concave surface 28a) into which the material of the rotor hub 20 can expand as the material grows during heating of the rotor hub 20. If the expansion space was not present (as with a conventional rotor hub), the outer periphery 22 of the rotor hub 20 would bend (or pitch) toward the housing 42 and contact (or hit) the housing 42 thereby impairing operation of the clutch.

The rotor 30 is received within a slot 12 and is configured to rotate within the slot 12. As shown in FIG. 1, the slot 12 is defined by a wheel portion 54 and a ring portion 56 of a housing insert 150. The rotor 30 includes a ring having a first side 32 affixed to the outer periphery 22 of the rotor hub 20. For example, the first side 32 of the rotor 30 can be crimped onto the outer periphery 22 of the rotor hub 20 (shown in FIG. 1) or otherwise coupled to rotor hub 20. The rotor 30 extends outwardly with respect to a face of the rotor hub 20 so that the first side 32 of the rotor 30 is closer to the rotor hub 20 than a second side 34 of the rotor 30, as shown in FIG. 1. The rotor 30 extends in a direction toward the fan cover body 52. The rotor 30 can be made of a magnetically permeable ferrous material, such as a low carbon steel alloy, preferably ASTM 1006 or ASTM 1008. Alternatively, the rotor 30 can be made of a magnetically permeable non-ferrous material.

The rotor 30 can include a grooved portion 36 disposed between the first side 32 and the second side 34 of the rotor 30 to prevent a magnetic field from shunting along the rotor 30. The grooved portion 36 can be formed so that other portions (i.e., non-grooved portions) of the rotor 30 have a thickness that is sufficiently greater than a thickness of the grooved portion 36 to prevent a substantial path for magnetic flux across the rotor 30. For example, the thickness of the grooved portion 36 can be approximately 0.25 to 0.33 mm, and the thickness of first and second ends 32, 34 can be approximately 2.44 mm. The grooved portion 36 can include grooves 36a and protrusions 36b, which can be configured for ease of manufacture. As shown in FIG. 2, the grooves 36a and protrusions 36b, in one embodiment, preferably have a W-shaped profile that can be formed by rolling as opposed to machining. In this manner, the rotor 30 can be formed without an additional machining step. The grooves 36a and the protrusions 36b can also have other profiles, such as a saw tooth profile, a V-W shaped profile, and a W-W shaped profile.

Figure 20A:
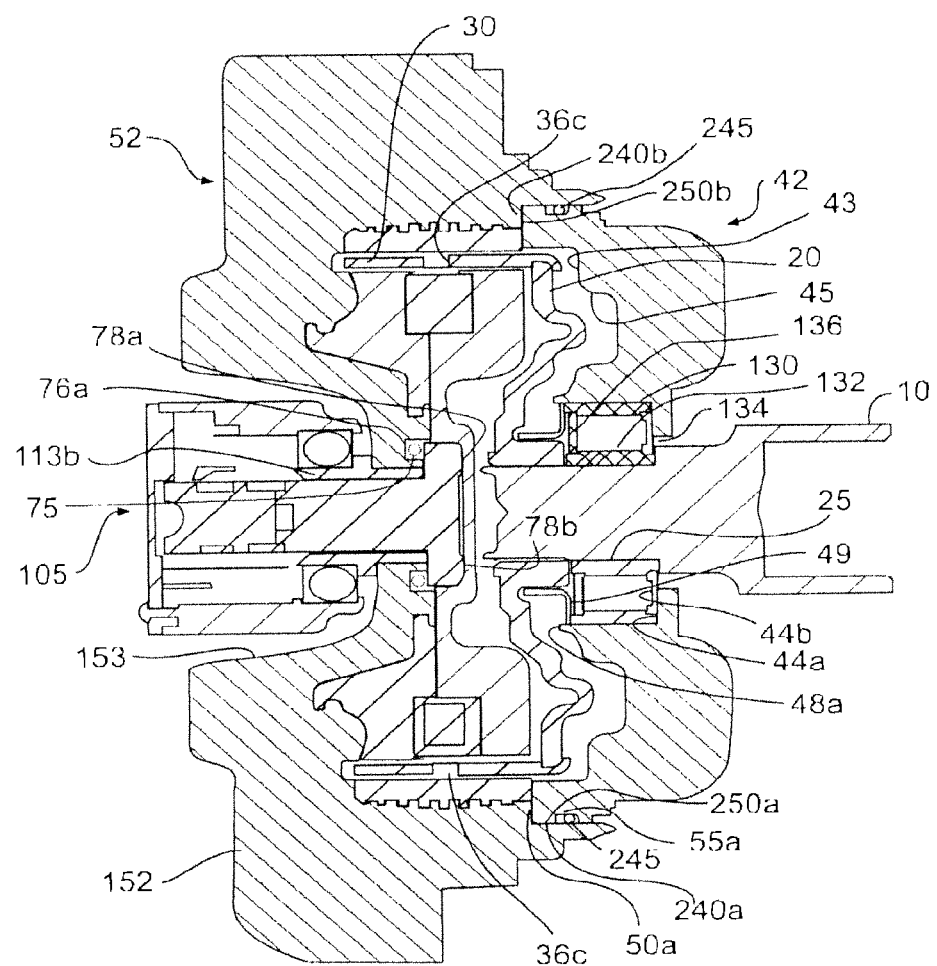
FIG. 20A is a cross sectional side elevation view of a clutch assembly according to another embodiment of the present invention taken along a first line.
Figure 20B:
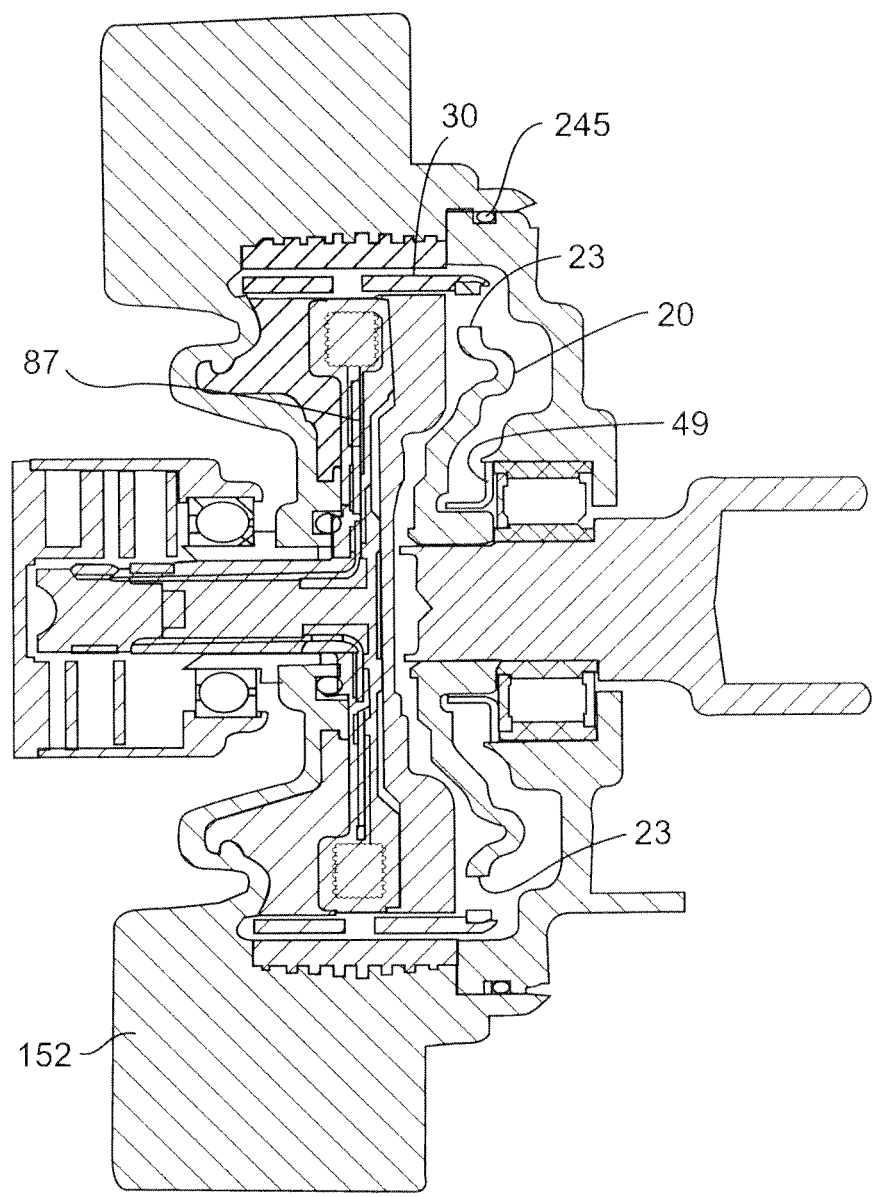
FIG. 20B is a cross sectional side elevation view of the clutch assembly of FIG. 20A taken along a second line perpendicular to the first line.

Alternatively, as illustrated in FIGS. 20A and 20B, the grooved portion 36 can have a generally rectangular groove or channel 36c that is machined into the outer circumference of the rotor 30. Placing the groove 36c on the outer circumference or diameter of the rotor 30 allows the rotor to be machined from only one side, allows the inner circumference of the rotor 30 to remain flush and uninterrupted, and better avoids collection or stagnation of magnetic particles of the MRF fluid.

According to one exemplary embodiment, the rotor ring (rotor 30) can be made by forming a suitable material into a longitudinal strip and mating the ends of the strip together (e.g., by welding). Alternatively, the rotor ring can be formed as a seamless rolled ring. For example, the rotor ring is formed from sheet stock low carbon steel that is formed into a cup shape by a cup drawing process, trimmed, and rolled to size to form the rotor ring (rotor 30). A separate rolling operation can be used to thin and shape a central portion of the ring to create the grooved portion 36. Accordingly, the rotor 30 can be formed in a non-machined manner to reduce manufacturing complexity. Alternatively, the groove 36 can be machined into the rotor 30. The first side 32 of the rotor ring (rotor 30) can be connected (e.g., crimped) to the outer periphery 22 of the rotor hub 20, which can be stamped from a suitable material and can optionally be formed to include the formed portion 28.

Figure 4:
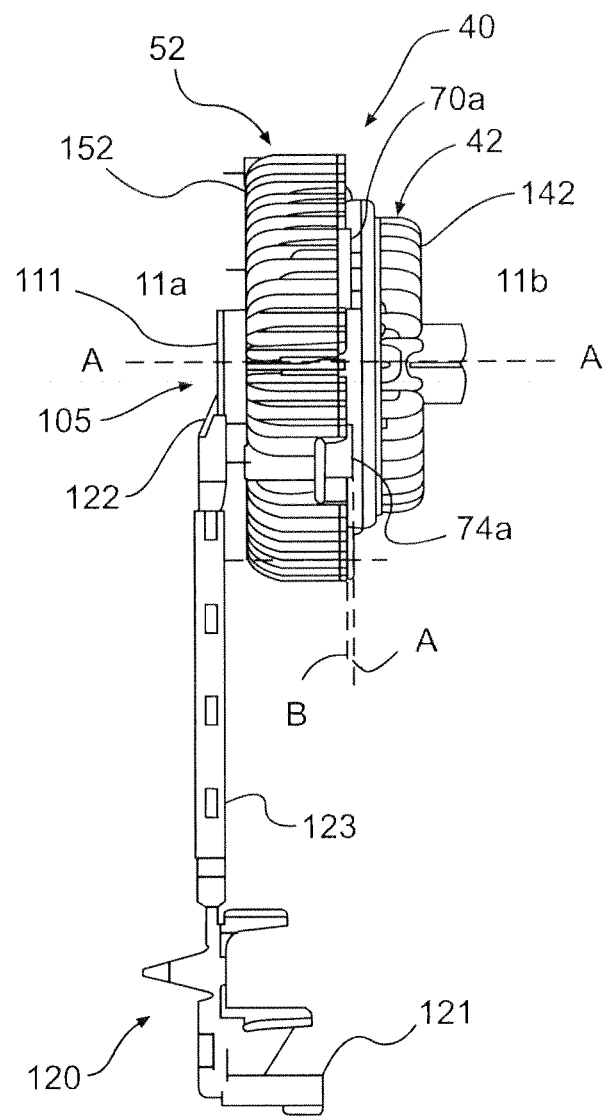
FIG. 4 is a side elevation view of the clutch housing assembly of FIG. 3.

The clutch housing assembly 40 includes an annular housing 42 and a cover 52 (as shown in FIGS. 1 and 4). The housing 42 and the cover 52 are preferably made of cast aluminum and are joined together to form the clutch housing assembly 40 with the cover 52 being disposed on a forward (or front) end 11a of the MRF clutch 1, and the housing 42 being disposed on an aft (or rear) end 11b of the MRF clutch 1. The forward (or front) end 11a of the MRF clutch 1 is the end of the MRF clutch 1 facing toward a forward (or front) end of a vehicle when the MRF clutch 1 is installed in the vehicle. Similarly, the aft end 11b of the MRF clutch 1 is the end of the MRF clutch 1 facing toward an aft (or rear) end of the vehicle when the MRF clutch 1 is installed in the vehicle.

The cover 52 includes an insert 150 comprising a wheel portion 54 and a ring portion 56. The insert 150 is made of a magnetically permeable ferrous material, such as a low carbon steel alloy, preferably ASTM 1010 or ASTM 1018 forged steel. Alternatively, the insert 150 may be made of a magnetically permeable non-ferrous material. The cover 52 is positioned around a portion of the insert 150. For example, the cover 52 is preferably made of aluminum and cast around the metal insert 150. To improve the adhesion of the cover 52 to the metal insert 150 when the cover 52 is cast over the metal insert 150, the surface of the insert 150 optionally may be treated with a latent exoergic coating in the manner disclosed in U.S. Pat. No. 5,429,173, which is incorporated by reference herein. According to one exemplary embodiment, the latent exoergic coating is a 50/50 Cu/Al having a coating thickness of approximately 0.30 mm to approximately 0.60 mm and is preferably approximately 0.46 mm mixture.

As shown in FIG. 1, the housing 42 and the cover 52 connect together to enclose the rotor hub 20, the rotor 30, and a portion of the coil body 82 and to form a reservoir 16. The reservoir 16 contains a magnetorheological fluid within the clutch housing assembly 40. The clutch housing assembly 40 can also include cooling fins 142 disposed on an external portion of the housing 42 and cooling fins 152 disposed on an external portion of the cover 52. The cooling fins 142 and 152 dissipate heat generated during operation of the MRF clutch 1. According to one exemplary embodiment, the cooling fins 152 extend radially inwardly toward the center of the cover 52 so that an innermost end 153 of at least some of the cooling fins 152 is disposed generally proximate brush box 105 (described below) as shown in FIG. 20A. Extending cooling fins 152 inwardly toward brush box 105 is intended to improve the transfer of heat from the central portion of cover 52. The extension of the cooling fins 152 may also improve the flow of material (e.g., aluminum, etc.) when the cover 52 is cast over the insert 150.

According to one embodiment illustrated in FIG. 1, the housing 42 includes a stepped radial contact face 240, and the cover 52 includes a stepped radial contact face 250. The stepped radial contact face 240 is disposed adjacent to the stepped radial contact face 250 to form an area of contact between the housing 42 and the cover 52 that provides labyrinth sealing surfaces 50. The stepped contact faces 240 and 250 also provide pilot surfaces for radial alignment of the housing 42 and the cover 52. Additionally, the cover 52 can include a radially extending pocket 55 configured to receive a sealant, such as a polymeric sealant, or a static o-ring. The labyrinth sealing surfaces 50 and the sealant in the pocket 55 substantially prevent the leakage of MRF from the clutch housing assembly 40.

According to an alternative embodiment illustrated in FIGS. 20A and 20B, the housing 42 includes an axial contact face 240 a and a radial contact face 240b, and the cover 52 includes an axial contact face 250a and a radial contact face 250b on an annular projection. The axial contact face 240a is disposed adjacent to the axial contact face 250a and the radial contact face 240b is disposed adjacent to the radial contact face 250b to form a radial and an axial area of contact between the housing 42 and the cover 52 that provides labyrinth sealing surfaces 50a. The contact faces 240a and 250a also provide pilot surfaces for radial alignment of the housing 42 and the cover 52. Additionally, the housing 42 can include an axially extending pocket or groove 55a configured to receive a sealant, such as a polymeric sealant, or a static o-ring 245. The labyrinth sealing surfaces 50a, the line-to-line contact between contact faces 240b and 250b, and the sealant in the pocket 55a substantially prevent the leakage of MRF from the clutch housing assembly 40 and are configured to minimize the volume where the magnetorheological fluid may accumulate and pack during the life of the MRF clutch 1.

The housing 42 is rotatably disposed on the input shaft 10 so that the housing 42 is isolated from torque application from the input shaft 10. According to one exemplary embodiment, a bearing set 18 is coupled between the housing 42 and the input shaft 10. The bearing set 18 includes an outer race 130, an inner race 132, a set of rollers or balls (not shown), an outer seal 134, and an inner seal 136. The outer race 130 is pressed into the housing 42 (from an exterior or aft side of the housing 42) so that the outer race 130 of the bearing set 18 abuts against a surface 44 of the housing 42, as shown in FIG. 1. A radial projection 48 of the housing 42 can be rolled over the outer race 130 to lock the bearing set 18 with the housing 42. The input shaft 10 can be pressed into the inner race 132 of the bearing set 18 until a surface 10a of the input shaft 10 abuts the inner race 132. The rotor hub 20 can be pressed onto the input shaft 10 until a step or projection 25 of the rotor hub 20 that extends toward the bearing set 18 seats against the inner race 132. The projection 25 serves to space the more radially outward portions of the rotor hub 20 away from the bearing set 18 to prevent the rotor hub 20, which may be rotating at one speed, from contacting the inner seal 136 of the bearing set, which may be rotating at a different speed. Additionally, the projection 25 serves to space the more radially outward portions of the rotor hub 20 away from the inner seal 136 to improve the durability of the inner seal 136 due to operating at a lower temperature under some operating conditions. A radial extension 10b on an end of the input shaft 10 can be staked to lock the rotor hub 20 onto the input shaft 10. Thus, the input shaft 10 extends through the bearing set 18, the housing 42, and the rotor hub 20 and locks the bearing set 18, the housing 42, and the rotor hub 20 together. The outer seal 134 generally extends between the outer race 130 and the inner race 132 on the side of the bearing set 18 facing the outer surface of housing 42 (e.g., the side facing the rear). Similarly, the inner seal 136 generally extends between the outer race 130 and the inner race 132 on the side of the bearing set 18 facing the inner surface of housing 42 (e.g., the side facing the front). Each of the outer seal 134 and the inner seal 136 generally comprises a rigid core or insert surrounded by a fluoroelastomer material, such as, for example, a fluorocarbon or polytetrafluoroethylene (PTFE) material. Unlike the outer seal 134, the inner seal 136 is exposed to the pressurized and heated magnetorheological fluid in the reservoir 16. To enable the bearing set 18 to withstand this environment, including pressures up to and above 120 psig, the inner seal 136 is constructed from a fluoroelastomer, such as VITON, commercially available from DuPont Dow Elastomers L.L.C., over molded on a rigid structural element to withstand axial deformation (oil-canning), thus keeping the lip of the seal in proper sealing position during periods of high temperature clutch operation. According to one exemplary embodiment, the bearing set 18 is a 6204 size single row ball. According to other alternative and exemplary embodiments, the bearing set 18 may be any known or appropriate bearing set.

As shown in FIG. 1, the housing 42 can have an annular neck 46 disposed on an inner periphery of the housing 42. The annular neck 46 is sized so that it extends into a recess 47 formed in the back surface of the rotor hub 20 and so that a clearance between the annular neck 46 of the housing 42 and the annular neck 26 of the rotor hub 20 forms a labyrinth sealing path to substantially prevent the magnetorheological fluid in the reservoir 16 from entering the bearing set 18 and to substantially protect the bearing set 18 from the magnetorheological fluid.

Figure 19:
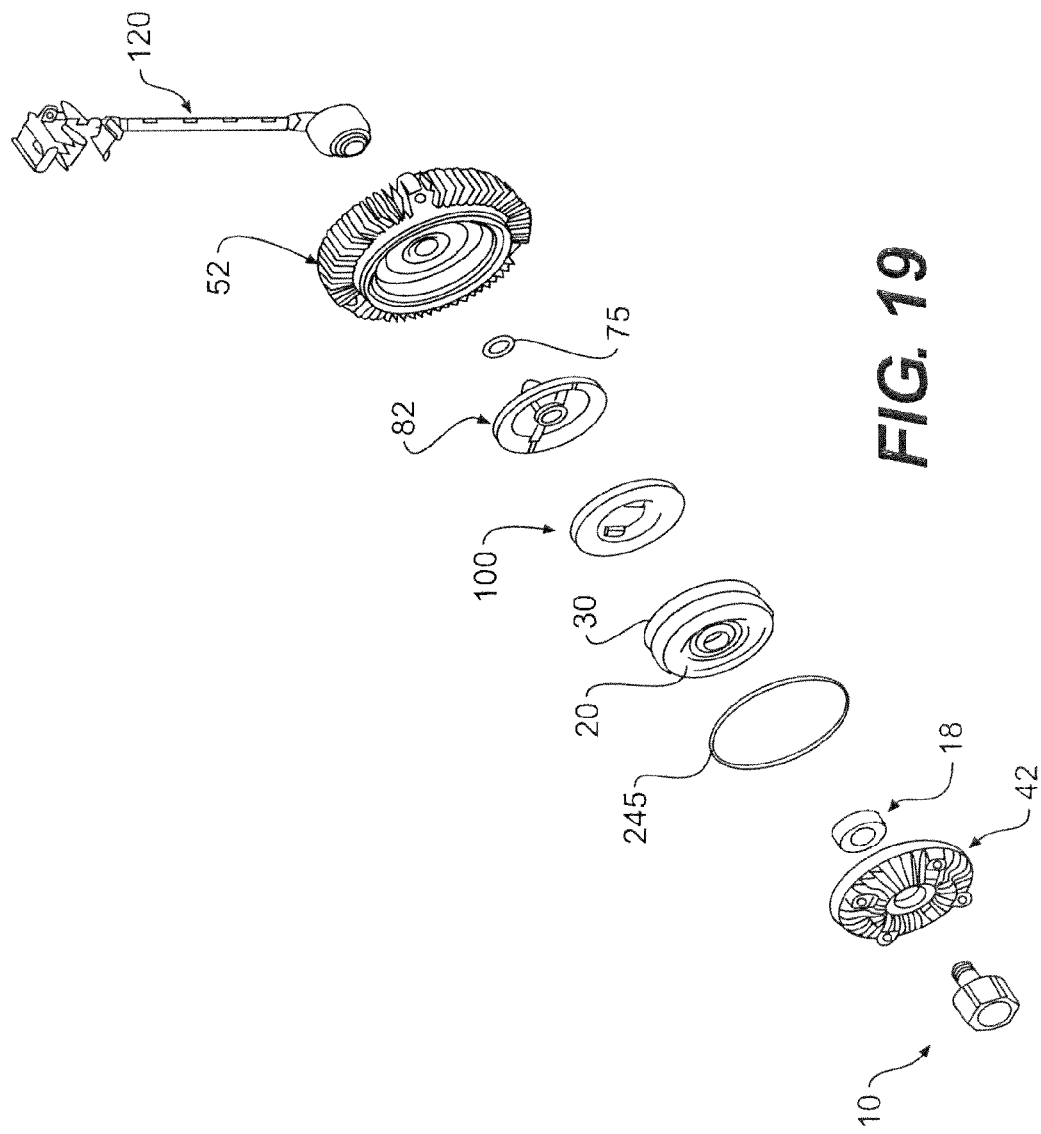
FIG. 19 is an exploded perspective view of a clutch assembly according to the another embodiment of the present invention.

According to an alternative embodiment illustrated in FIGS. 19-20B, the housing 42 can be arranged so that the radial projection 48 and the extension forming the surface 44 are switched (i.e., relocated 180 degrees). In other words, a radial projection 48a can be located forward of a surface 44a (with respect to the vehicle) so that the bearing set 18 can be pressed into the housing 42 from an interior (or forward) side of the housing 42 to abut the surface 44a. In this arrangement, the annular neck 46 of the housing is eliminated. In order to retain the labyrinth sealing function of the annular neck 46, an L-shaped washer 49 that is intended to function in the same general manner as annular neck 46, is optionally fitted against the bearing set 18 after the bearing set 18 is pressed into the housing 42. The radial projection 48a of the housing 42 can then be rolled over to lock the L-shaped washer 49 and the bearing set 18 with the housing 42. The input shaft 10 can be installed as discussed above. Surface 44a has a projection 44b which contacts the outer seal 134 which serves to help retain the outer seal 134 during periods of high pressure and high temperature operation.

Referring to FIGS. 1, 20A, and 20B, the housing 42 includes internal walls or surfaces 43 and 45. Internal wall 43 is located to the rear of rotor 30 and is oriented generally perpendicular to the axis of rotation A-A of the input shaft 10. Internal wall 43 extends radially inward from the radially outer edge of the slot 12 to a point that is radially inward of the magnetorheological fluid fill line, which represents the distance the magnetorheological fluid extends radially inward from the outer edge of the slot 12 when the magnetorheological fluid is subjected to the centrifugal force generated by the rotation of the MRF clutch 1. The location and orientation of internal wall 43 reduces the amount of magnetorheological fluid needed to fill reservoir 16. Internal wall 45 extends radially inwardly and outwardly from internal wall 43 at an angle ranging from between approximately 5 and 30 degrees relative to the axis of rotation A-A of the input shaft 10, preferably at an angle of approximately 26 degrees. The angled orientation of internal wall 45 facilitates the movement of the magnetorheological fluid to the radially outer portions of the reservoir 16 (e.g., those portions proximate internal wall 43), and helps to reduce any packing of the particles of the magnetorheological fluid, as the magnetorheological fluid is subjected to centrifugal forces and moves outward.

Figures 5, 5A:
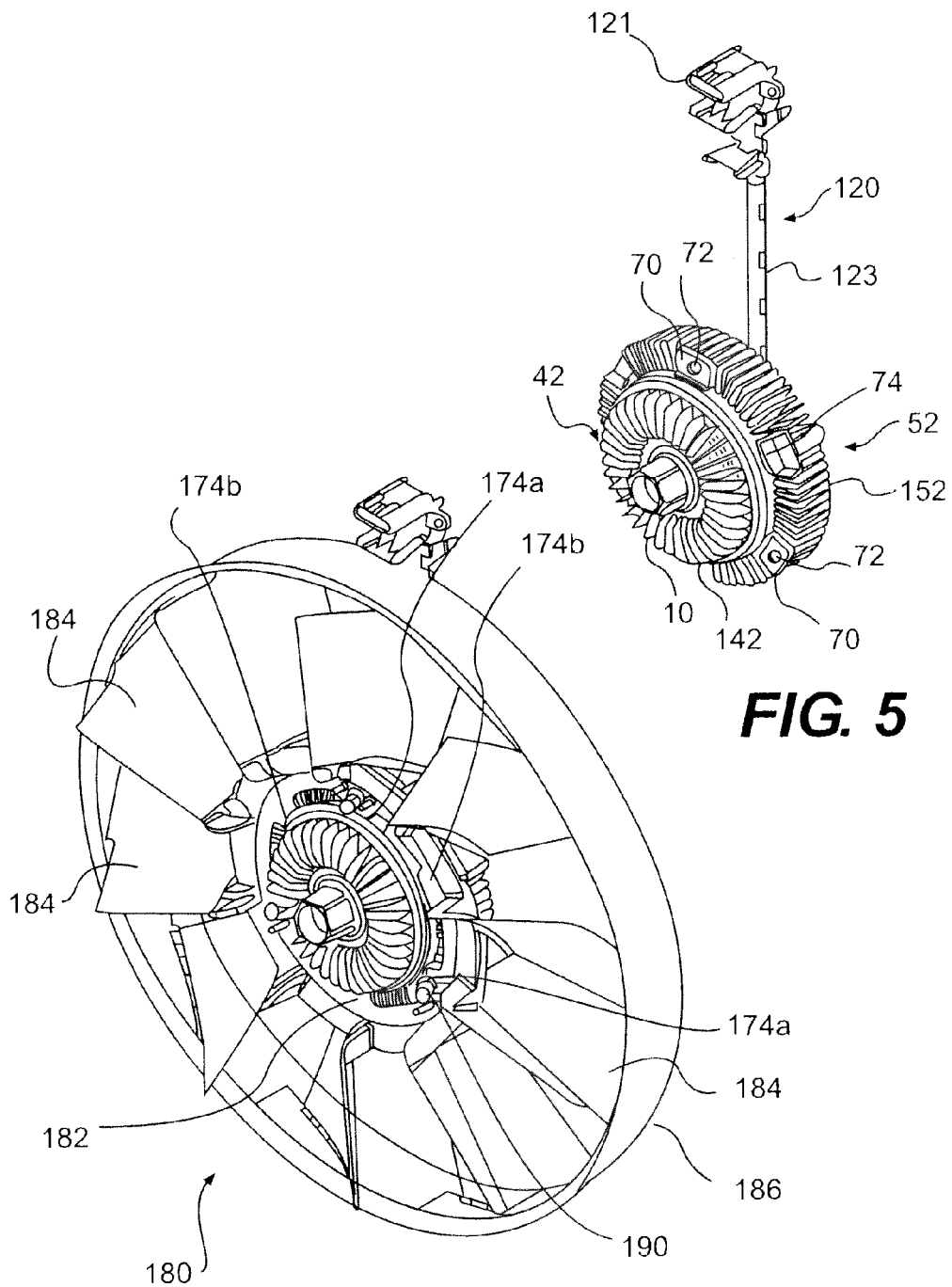
FIG. 5 is a perspective view of the clutch housing assembly of FIG. 3.
FIG. 5A is a perspective view of the clutch housing assembly of FIG. 5 showing a fan blade assembly attached thereto.
Figure 5B:
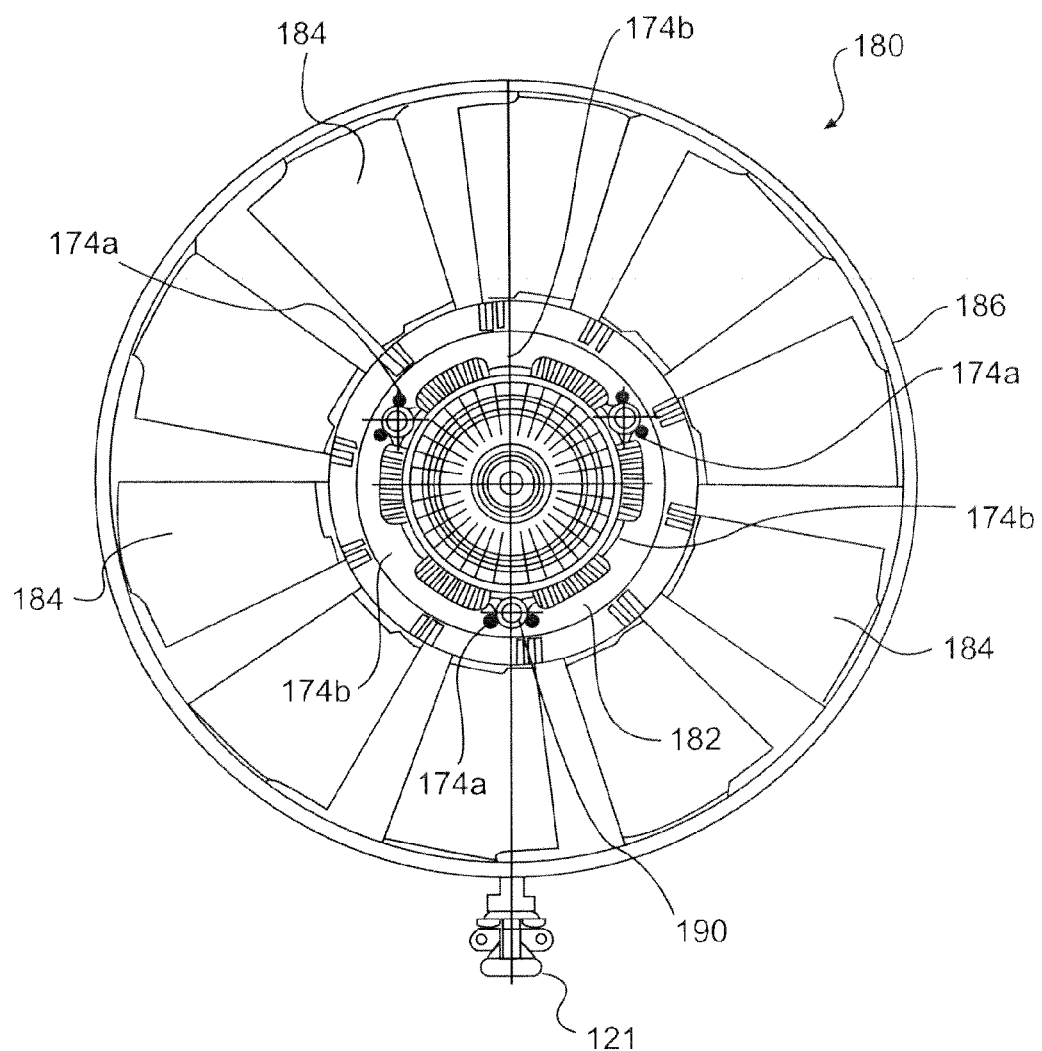
FIG. 5B is a rear perspective view of the fan blade assembly of FIG. 5A.

The cover 52 is configured to support a fan blade assembly 180, as shown in FIGS. 5A and 5B. The fan blade assembly 180 includes a fan hub 182, a plurality of blades 184 extending radially from a periphery of the fan hub 182, and a ring 186 connected to an end 184a of each blade 184. The fan hub 182 is metal, preferably steel, and the blades 184 and ring 186 are plastic, preferably a nylon 6/6 material with reinforced fiberglass, that is injection molded (over-molded) around the fan hub 182. Preferably, the over-molding substantially fully encompasses the fan hub 182 (with the exception of bolt mounting pads 70) to protect the metal fan hub 182 from corrosion thus eliminating the need for additional corrosion protection.

Figure 3:
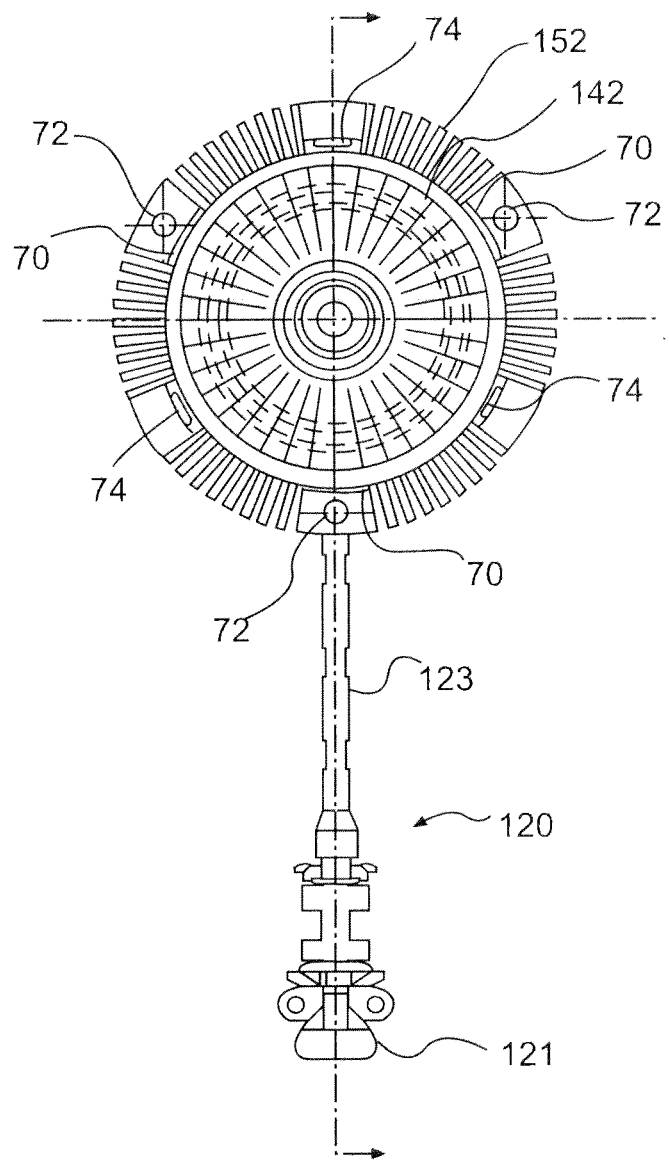
FIG. 3 is a rear elevation view of a clutch housing assembly of FIG. 1.

The cover 52 is configured so that the fan hub 182 can be mounted to the cover 52. For example, the cover 52 includes a fan hub mounting portion having three angularly spaced mounting pads 70, as shown in FIGS. 3 and 5. The mounting pads 70 are preferably substantially equally spaced apart from one another and are configured to enable attachment of the fan hub 182. For example, each mounting pad 70 can include a pilot hole 72 configured to receive a fastener 190, such as a bolt.

The fan hub mounting portion can also include three angularly spaced contact pads 74, as shown in FIGS. 3 and 5. The contact pads 74 are preferably substantially equally spaced apart and are configured to create a clamping load when the fan hub 182 is affixed to the hub mounting portion of the cover 52. Preferably, each mounting pad 70 has a contact pad 74 disposed on each side of the mounting pad 70 (as shown in FIG. 3). Similarly, each contact pad 74 preferably has a mounting pad 70 disposed on each side of the contact pad 74.

As best shown in FIG. 4, the contact pads 74 are offset from the mounting pads 70 in a direction aligned with the axis of rotation A-A of the input shaft 10. For example, the contact pads 74 are designed so that a plane A (which is defined by a surface 74a of at least one of the contact pads 74) is substantially parallel to and offset from a plane B (which is defined by a mounting face 70a of at least one of the mounting pads 70). The contact pads 74 are preferably offset away from the cover 52 (i.e., offset toward the aft end 11b of the MRF clutch 1) so that the contact pads 74 extend beyond the mounting pads 70.

As best shown in FIG. 5B, the fan hub 182 can include substantially flat interface pads 174a and 174b radially projecting from an inner periphery of the fan hub 182. There is one interface pad 174a for each mounting pad 70 and one interface pad 174b for each contact pad 74. The interface pads 174a and 174b are angularly spaced apart on the fan hub 182 so as to correspond to the locations of the mounting pads 70 and the interface pads 74, respectively, when the fan hub 182 is mounted to the cover 52. Each interface pad 174a includes a bolt hole to receive a fastener 190 and is configured to contact the mounting face 70a of a mounting pad when the fan hub 182 is installed on the cover 52. Similarly, each interface pad 174 is configured to contact the surface 74a of a contact pad 74 when the fan hub 182 is installed on the cover 52.

When the fan hub 182 is affixed to the mounting pads 70 and the fasteners 190 are tightened, a preload (or clamping) force develops at the contact pads 74. The preload force develops as follows. When the fan hub 182 is aligned on the hub mounting portion of the cover 52, the interface pads 174b contact the surfaces 74a (plane A) of the contact pads 74. At the same time, a gap exists between the interface pads 174a and the mounting faces 70a of the mounting pads 70 (due to the offset condition described above). When the fasteners 190 are tightened on the mounting pads 70, the gap is closed (i.e., the interface pads 174a come into contact with the mounting faces 70a). At the same time, a preload force is generated between the contact pads 74 and the interface pads 174b, which are already in contact. In this manner, the fan hub 182 is constrained in six places (i.e., at the three mounting pads 70 and at the three contact pads 74) even though only three fasteners 190 are used. Thus, during manufacture of the MRF clutch 1, the fan hub 182 can be securely affixed to the cover 52 using only three fasteners 190 while still maintaining a sufficient force to clamp the installed fan blade assembly 180 to the cover 52. Therefore, fewer components (e.g., half as many fasteners as a conventional fan clutch) and less labor are required, which results in reduced cost and weight. It will be recognized that the mounting arrangement described above can be used in applications other than fans for a clutch in a vehicle, such as any type of fan blade mounting arrangement for any type of device.

Figure 16:
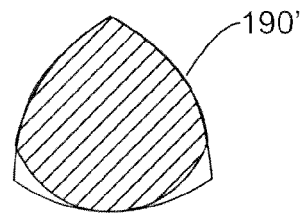
FIG. 16 is a section view taken along line B-B of FIG. 16A showing a tri-lobular shape of a fastener thread.
Figure 16A:
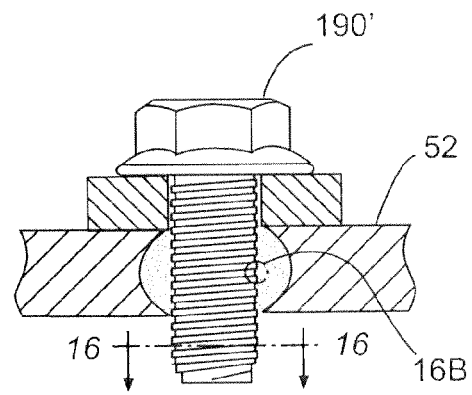
FIG. 16A is perspective side view partly in section of a self-tapping fastener installed in a cover of a clutch housing assembly according to an embodiment of the present invention.
Figure 16B:
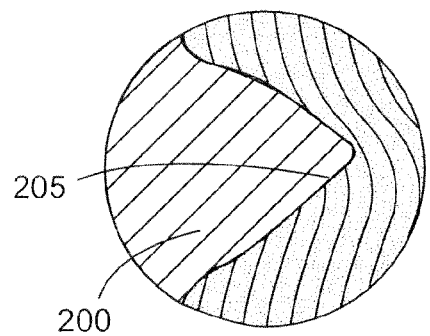
FIG. 16B is a view of detail B of FIG. 16A.

The pilot holes 72 in the mounting pads 70 can be threaded (e.g., using a thread cutter or a tap as is well known) for engagement with corresponding threaded fasteners 190. Alternatively and preferably, the pilot holes 72 can be unthreaded, and fasteners 190' (shown in FIG. 16A) can be used. The fasteners 190' are preferably tri-lobular, self-tapping fasteners, such as a tri-lobular screw. The tri-lobular shape of the fastener 190' is shown in FIG. 16. When a self-tapping fastener 190' is installed in an unthreaded pilot hole 72, the tri-lobular, self-tapping fastener rolls (forms) threads 200 in an interior surface of the pilot hole 72. As shown in FIG. 16B, the rolled threads preserve the integrity of a shell (skin) 205 of the cast cover 52 so that porosity within the cover 52 casting is not exposed. The rolling process of the tri-lobular fastener 190' deforms the cast material forming the shell 205 without cutting the shell 205 so that a leak path from an interior (i.e., the reservoir 16) of the clutch housing assembly 40 to an exterior (i.e., into the pilot hole 72) of the clutch housing assembly 40 is not formed. Additionally, the threads 200 are formed in the pilot holes 72 at the same time the self-tapping fasteners 190' are installed the cover 52 thereby effectively combining two assembly steps (i.e., tapping and fastener installation) into one assembly step (i.e., fastener installation). Thus, the use of self-tapping fasteners 190' eliminates the need to tap (i.e., machine) threads in the cast cover 52 thereby reducing manufacturing cost and labor as well as the risk of leaks due to the porous nature of the cast aluminum material used to form the cover 52. Additionally, the self-tapping fastener 190' can be removed and reinserted such as is required when servicing the MRF clutch 1. Once removed, the self-tapping fastener 190' can even be replaced with a standard threaded fastener, such as a machine screw or bolt.

As mentioned above, the cover 52 is preferably cast around the metal insert 150, which includes the wheel portion 54 and the ring portion 56. As shown in FIG. 6C, the insert 150 can initially be formed as a single precursor piece 150' (e.g., by hot forging a suitable steel alloy blank). The aluminum cover 52 can be cast around the precursor piece 150'. The cast cover 52 and the precursor piece 150' can then be machined so that the ring portion 56 is separated from the wheel portion 54 by the slot 12, as described in U.S. Pat. No. 6,585,092, incorporated by reference herein. The rotor 30 is received in the slot 12, which provides clearance for the rotor 30 so that gaps 62 and 64 exist between the rotor 30 and the wheel portion 54 and the ring portion 56, respectively. Separating the ring portion 56 and the wheel portion 54, creates a magnetic flow path that travels in the wheel portion 54 and the ring portion 56 of the insert 150. Thus, a magnetic field generated by the coil assembly 80 is prevented from shunting in the gaps 62 and 64. According to the above-described arrangement, the rotor 30, the rotor hub 20, and the input shaft 10 function as a rotor assembly 300 of the MRF clutch 1, and the clutch housing assembly 40 functions as a stator assembly 350 of the MRF clutch 1, with the MRF enabling coupling of the rotor assembly 300 and the stator assembly 350 to thereby drive the fan blade assembly 180.

The rotor 30 and the slot 12 are positioned relative to one another and to other portions of MRF clutch 1 so as to optimize the reduction of any packing of the particles of the magnetorheological fluid that may occur during the life of the MRF clutch 1. For example, the distance between the distal end (or forward most end) of the rotor 30 and the end of slot 12 is between approximately 1.8 and 2.6 times the size of the gap 64, more preferably between approximately 2.0 and 2.4 times the size of the gap 64, and most preferably approximately 2.2 times the size of the gap 64. The axial distance between rotor hub 20 and the internal wall 43 of the housing 42 is between approximately 2.8 and 3.6 times the size of the gap 64, more preferably between approximately 3.0 and 3.4 times the size of the gap 64, and most preferably approximately 3.2 times the size of the gap 64. The axial distance between rotor hub 20 (proximate its outer periphery 22) and the coil cover 100 is between approximately 1.2 and 2.0 times the size of the gap 64, more preferably between approximately 1.4 and 1.8 times the size of the gap 64, and most preferably approximately 1.6 times the size of the gap 64.

In addition to being positioned within MRF clutch 1 in a manner that reduces the packing of the magnetorheological fluid that may occur during the life of the MRF clutch 1, the rotor 30, the slot 12, and portions of housing 42 are configured or shaped to minimize any such packing. For example, the radially outer and inner corners at the distal end of the rotor 30 may be radiused, may be chamfered, or may include a fillet. The radius of the forward-most end of slot 12 is between approximately 1.3 and 2.1 times the size of the gap 64, more preferably between approximately 1.5 and 1.9 times the size of the gap 64, and most preferably approximately 1.7 times the size of the gap 64. The radius of the corner at the radially outer end of internal wall 43 is between approximately 1.8 and 2.6 times the size of the gap 64, more preferably between approximately 2.0 and 2.4 times the size of the gap 64, and most preferably approximately 2.2 times the size of the gap 64.

The rotor 30, the wheel portion 54, and the ring portion 56 also preferably include roughened surfaces configured to promote shear of the magnetorheological fluid closer to the center of the gaps 62, 64. For example, surfaces 210 of the rotor 30, the wheel portion 54, and the ring portion 56 that are in shear with the magnetorheological fluid during operation of the MRF clutch 1 have a surface roughness of approximately between 6 to 200 µm, and preferably between 8 to 12 µm. The roughened surfaces 210 enable magnetic particles in the magnetorheological fluid to attach to the surfaces 210 and be tightly packed thereon. Such dense packing of the magnetic particles near the surfaces 210 enables shear of the magnetorheological fluid to occur closer to the center of the gaps 62, 64 rather than at or near the surfaces 210. When shear of the MRF occurs at a surface 210, a significant amount of heat is generated at the surface 210 which can lead to damage to the magnetic particles in the MR fluid. According to various exemplary embodiments, the roughened surfaces 210 can take one of a variety of different configurations. For example, one or more of the roughened surfaces may be knurled, or they may be textured in some other manner using one of a variety of different texturing patterns.

The insert 150 is preferably configured to reduce leakage of the magetorheological fluid from the clutch housing assembly 40. In particular, the wheel portion 54 is preferably shaped to form a labyrinth seal path 54a (e.g., a serpentine shaped path) between the wheel portion 54 and the cover 52. The labyrinth seal path 54a is configured to direct fluid entering the labyrinth seal path 54a into the fluid reservoir 16. As shown in FIG. 1, both ends of the labyrinth seal path 54a lead to the reservoir 16. Thus, MRF in the reservoir 16 that leaks into one end of the labyrinth seal path 54a will exit at the other end of the labyrinth seal path 54a back into the reservoir 16. The labyrinth seal path 54a preferably includes a first end 54b disposed proximate the slot 12 near the second end 34 of the rotor 30 and a second end 54c disposed near a head portion 80a of the coil assembly 80. Additionally, the wheel portion 54 can include an annular locking extension member 58 to interlock the wheel portion 54 to the cast-around cover 52 so that the wheel portion 54 and the cover 52 are anchored against separation.

Figure 6:
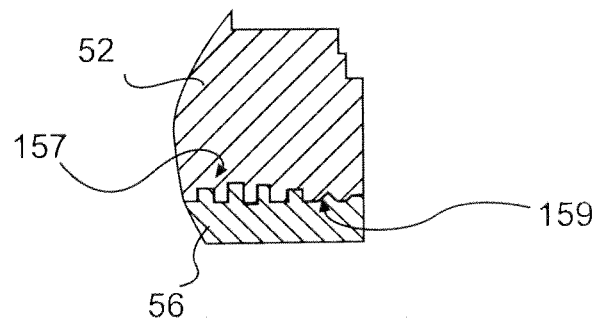
FIG. 6 is a view of detail A in FIG. 1 showing engagement of a clutch housing assembly cover and cover insert.
Figure 6A:
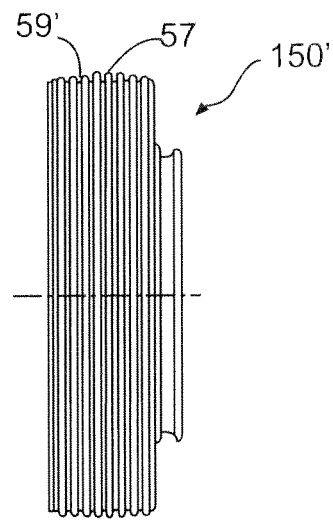
FIG. 6A is a side elevation view of the insert of FIG. 6 without the cover.
Figure 6B:
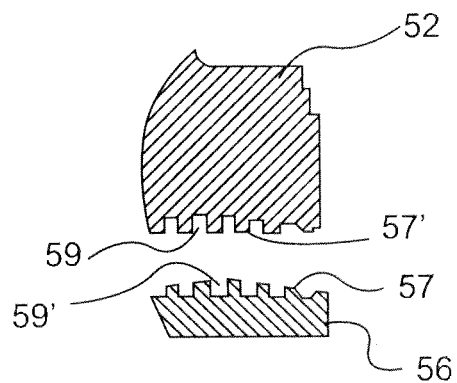
FIG. 6B is a view of the cover and insert of FIG. 6 showing the insert separated from the cover.
Figure 6C:
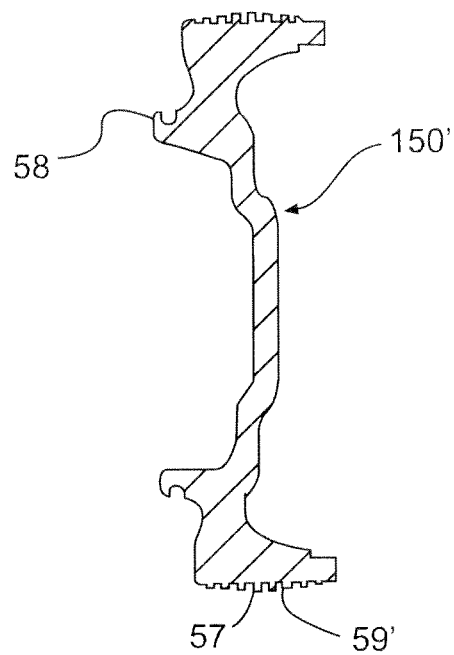
FIG. 6C is a cross sectional side elevation view of the housing insert of FIG. 6A prior to a machining after casting operation.

The ring portion 56 of the insert 150 can optionally include an annular extension member 57 disposed on an outer periphery of the ring portion 56, as best shown in FIGS. 6, 6A, and 6B. The extension member 57 can be configured to mechanically engage an annular complimentary groove 59 disposed on an inner periphery of the cover 52 to lock the ring portion 56 and the cover 52 together. Similarly, the inner periphery of the cover 52 can include an annular extension member 57' and the outer periphery of the ring portion 56 can include a complimentary annular groove 59' to mechanically engage to lock the ring portion 56 and the cover 52 together.

Preferably, the extension members 57, 57' are annular threads 157 and the complimentary grooves 59, 59' are complementary threads 159, as best shown in FIGS. 1 and 6. The annular threads 157 and the annular complimentary threads 159 are preferably square profile threads, as shown in FIGS. 6 and 6B. Forming the extension members 57, 57' and the complimentary grooves 59, 59' as threads (rather than as a series of discontinuous grooves) is preferable because a thread is formed as a continuous cut, which requires fewer manufacturing steps than are required to form multiple individual grooves.

Additionally, the threads 157 and the complimentary threads 159 are preferably configured so that rotational force from the input shaft 10 causes the insert 150 and the cover 52 to more securely engage. The input shaft 10 (and therefore the clutch housing assembly 40 and fan blade assembly 180) rotates in a clockwise direction as viewed from the aft end 11b of the MRF clutch 1 and in a counterclockwise direction as viewed from the forward end 11b of the MRF clutch 1. Thus, the threads 157 and the complimentary threads 159 are preferably right hand threads. Therefore, similar to a threaded fastener, the threads 157 and the complimentary threads 159 mechanically engage the ring portion 56 of the insert 150 and the cover 52 so that movement of the ring portion 56 relative to the cover 52 causes the ring portion 56 to be more securely threaded with the cover 52. In other words, the annular threads 157 are configured to rotate in a direction of engagement with the complimentary threads 159 when the ring portion 56 moves relative to the cover 52 during operation of the MRF clutch 1.

Additionally, the locking function of the annular extension members 57, 57' and the grooves 59, 59' can be enhanced. As suggested in U.S. Pat. No. 4,788,885, which is herein incorporated by reference, the housing insert 150 and the cover 52 are made of different materials (e.g., steel and aluminum, respectively, as discussed above) preferably chosen to have different coefficients of heat expansion. Thus, when the cast cover 52 is heated during operation of the MRF clutch 1, the extension members 57, 57' more positively engage the complimentary grooves 59, 59'. In this manner, the cover 52 and the ring portion 56 of the housing insert 150 are secured against separation, and leakage of the magnetorheological fluid past the locking extension members 57, 57' is reduced or prevented.

The coil assembly 80 includes a coil body 82, a coil cover 100, and a brush box (electrical connector or electrical cap) 105. As best shown in FIG. 1, a portion of the coil body 82 is enclosed between the coil cover 100 and the wheel portion 54 of the housing insert 150, and an opposite portion of the coil body 82 protrudes from the cover 52 and is enclosed by the brush box 105. The coil cover 100 is made of a magnetically permeable ferrous or non-ferrous material.

Figure 7:
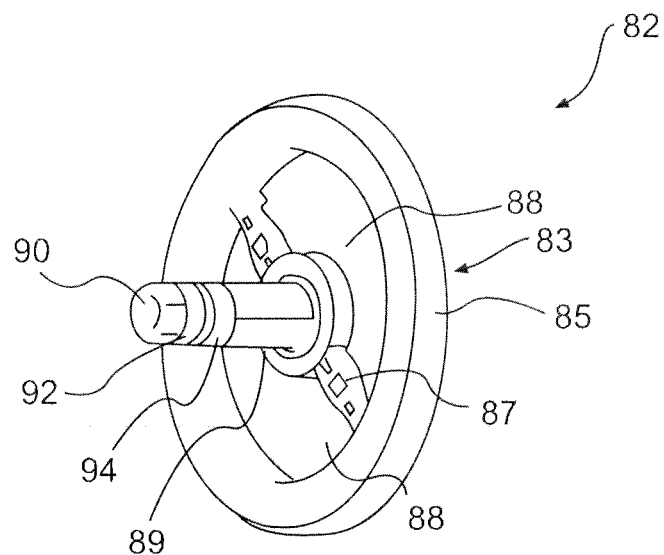
FIG. 7 is a perspective view of a coil assembly of FIG. 1.

As best shown in FIG. 7, the coil body 82 includes a bobbin member 83. The bobbin member 83 is a support structure for winding a wire 95 and includes a winding ring 85 and a crossbar (or spoke) 87. The crossbar 87 is connected to a central shaft 89 and can be used, for example, to align and locate the coil body 82 in the MRF clutch 1. The central shaft 89 extends outward from a midpoint of the crossbar 87. Apertures 88 exist between the winding ring 85 and the crossbar 87.

The coil body 82 also includes a magnet 90 affixed to an end of the central shaft 89. The magnet 90 of the coil body 82 can be segmented into two rings 92, 94 (e.g., a positive magnetic ring and a negative magnetic ring) that are disposed on an outer periphery of the central shaft 89. The segmented magnet 90 can be formed of a ferrite material in a PPS binder and can be segmented to provide, for example, six pulses per revolution (i.e., segmented to have six north poles and six south poles) of the coil body 82. In this manner, the segmented magnet 90 can work in conjunction with a Hall effect sensor disposed in the brush box 105 to measure fan speed thereby eliminating the need for a tone wheel in the brush box 105. Alternatively, if the magnet 90 is unsegmented, a tone wheel can be included in the brush box 105 to work in conjunction with the Hall effect sensor.

Figure 8:
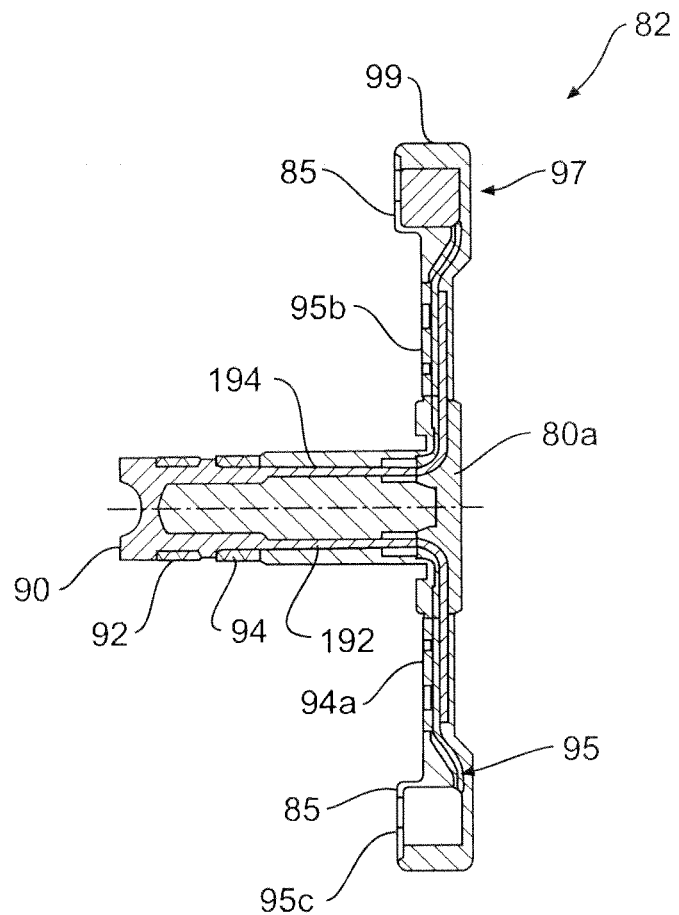
FIG. 8 is a cross sectional side elevation view of the coil assembly of FIG. 7.

A first coil lead 192 is connected (e.g., by welding) to the first slip ring 92, and a second coil lead 194 is connected to the second slip ring 94. As best shown in FIG. 8, the first and second coil leads 192, 194 extend through the central shaft 89 into the crossbar 87. The coil body 82 further includes a coil wire 95 wrapped around the winding ring 85 to form a coil 95c. Preferably, the coil 95c can be made in a free-wound state without a winding ring 85 by using a bondable coating magnet wire. Preferably, the coil wire 95 is a heavy polyimide enamel insulated magnet wire, and the coil 95c has multiple turns. One end of the coil wire 95a is in mechanical and electrical contact with the first coil lead 192, and the other end of the coil wire 95b is in mechanical and electrical contact with the second coil lead 194. For example, the ends of the coil wire 95 are preferably spliced together with the respective coil lead 192, 194.

The ends 95a and 95b of the wire 95 can be configured to perform a fail safe grounding function to prevent a complete short of the coil 95c. When the MRF clutch 1 is used in a vehicle having a negative ground, the end of the wire 95 that comprises that last winding of the coil is preferably the negative lead. In this manner, the possibility of a short due to the crossover of the end of the wire is eliminated so that a complete short of the coil is prevented.

The coil body 82 is preferably over-molded with an electrically insulating, non-magnetic material 97 for encapsulating the components of the coil body 82 to prevent a shunt in the magnetic field generated by the coil body 82. The over-mold material 97 can be, for example, a polymer material. Preferably, the over-mold material 97 is a thermosetting epoxy, in particular, a single-stage phenolic molding compound or other moldable material capable of operating at temperatures above 350 C. known by the brand name Plenco (manufactured by Plastics Engineering Co.) As shown in FIG. 8, the material 97 can be applied to the winding ring 85 and the crossbar 87 to encapsulate the coil wire 95 and to form a radial projection 99. The encapsulating material 97 thus prevents the magnetic field generated by the coil body 82 from shunting between the coil cover 100 and the wheel portion 54 of the housing insert 150.

As shown in FIG. 1, the winding ring 85 of the coil body 82 sits in a circular recess (or channel) in the wheel portion 54 of the housing insert 150 and is enclosed by the coil cover 100. Thus, the winding ring 85 and a substantial portion of the crossbar 87 are located between the wheel portion 54 and the coil cover 100. The wheel portion 54, the coil cover 100, and the coil body 82 are configured so that the volume between them is minimized to reduce potential locations where the magnetorheological fluid may accumulate.

As shown in FIGS. 1, 20A, and 20B, an o-ring 75 is disposed between the coil body 82 and a central portion of the cover 52 to substantially prevent the magnetorheological fluid and/or gas vapors from leaking past. According to one exemplary embodiment illustrated in FIG. 1, the head portion 80a of the coil body 82 includes an annular groove 76 configured to receive the o-ring 75. According to another exemplary embodiment illustrated in FIGS. 20A and 20B, the central portion of the cover 52, rather than the head portion 80a of the coil body 82, includes an annular groove 76a configured to receive the o-ring 75. According to either embodiment, the o-ring 75 is compressed between the central portion of the cover 52 and the head portion 80a of the coil body 82 about a shaft portion of the coil body 82. To resist any deflection or distortion of the head portion 80a of the coil body 82 in the vicinity of the o-ring 75, particularly when the temperature of the head portion 80a increases, and to ensure that the o-ring 75 remains adequately compressed, the coil cover 100 is configured to contact the back side of the head portion 80a, for example, at contact areas 78a and 78b (see FIG. 20A).

Figure 21:
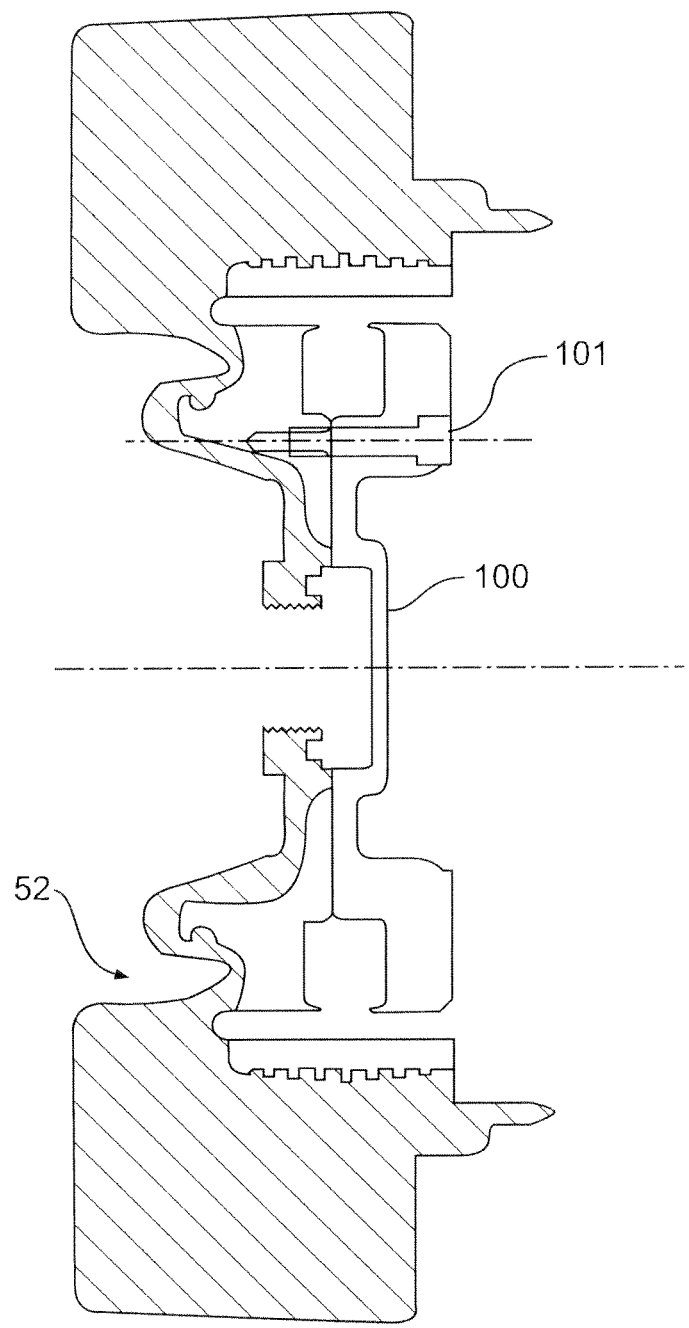
FIG. 21 is a cross sectional side elevation view of a cover and coil cover shown coupled together according to one embodiment of the present invention.

The apertures 88 in the coil body 82 enable the coil cover 100 to contact the wheel portion 54 of the housing insert 150 at a contact portion 104, as shown in FIG. 1. Thus, the coil cover 100 and the wheel portion 54 can be mechanically joined at the contact portion 104. For example, the coil cover 100 and the wheel portion 54 are preferably joined by laser welding but can also be joined by spot welding, pressing, riveting, by one or more of a variety of fasteners, or by any other process or device appropriate for integrating the wheel portion 54 and the coil cover 100 for connection with the coil body 82. For example, as illustrated in FIG. 21, the coil cover 100 and the wheel portion 54 may be coupled together by three screws located 120 degrees apart.

When the wheel portion 54 and the coil cover 100 are joined, a peripheral portion of the wheel portion 54 contacts the radial projection 99 of the coil body 82 at an area of contact 54*d*, as shown in FIG. 1. Similarly, a peripheral portion of the coil cover 100 contacts the radial projection 99 of the coil body 82 at an area of contact 100*d*. The areas of contact 54*d* and 100*d* thus form a seal between the wheel portion 54 and the coil body 82 and between the coil cover 100 and the coil body 82 to hamper or prevent passage of the magnetorheological fluid.

Figure 7A:
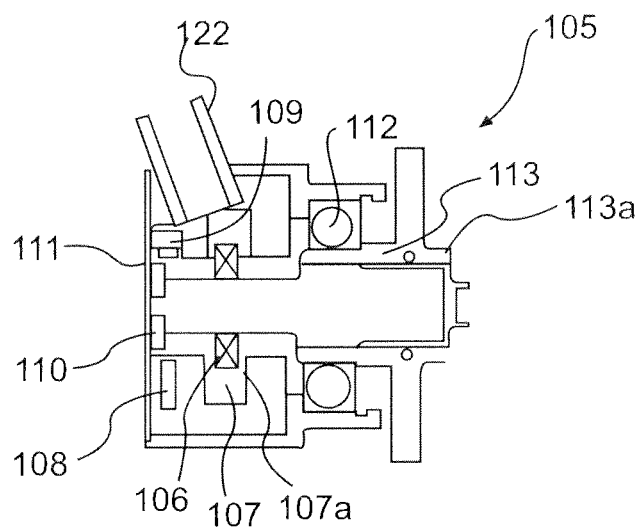
FIG. 7A is a cross sectional view of a brush box of FIG. 1.

The brush box 105 is a non-rotating brush assembly configured to supply power to the slip rings 92, 94. As best shown in FIG. 7A, the brush box 105 can include carbon brushes 106, brush holders 107, a brush release mechanism 107*a*, a circuit board assembly 108, a Hall effect sensor 109, and an ultrasonic welded cap 111. Power is supplied to the brushes 106 by the tether assembly 120. The circuit board assembly 108 can support noise suppression and signal conditioning electronics. The brushes 106, brush holders 107, and the brush release mechanism 107*a* are configured so that when the brush box 105 is assembled over the end of the central shaft 89, the brushes 106 are released to contact the slip rings 92, 94. As discussed above, the magnet 90 of the coil body 82 can be segmented for use in conjunction with the Hall effect sensor 109 to enable a fan speed feedback feature. Alternatively, if an unsegmented magnet is used, the brush box 105 can include a tone wheel 110.

As shown in FIGS. 1 and 7A, the brush box 105 is disposed (e.g., pressed) on a bearing 112 that is disposed (e.g., pressed) on a connection member 113. The connection member 113 preferably connects to the housing cover 52 via an external thread 113*a*, and the bearing 112 isolates the brush box 105 from rotational force imparted to the connection member 113 by the cover 52. According to one exemplary embodiment, the connection member 113 is configured to screw into the housing cover 52 after the housing cover 52, the coil assembly 82, the rotor hub 20, the rotor 30, and the housing 42 have been assembled. According to another exemplary embodiment illustrated in FIG. 20A, the connection member 113*b* is configured to screw into the housing cover 52 prior to the coupling of the coil assembly 82, the rotor hub 20, the rotor 30, and the housing 42, within the cover 52. To facilitate the coupling of the connection member 113*b* to the cover 52 in this manner, the rear portion or end of the connection member 113*b* includes a set of notches or grooves that allow a tool that approaches the connection member 113*b* from a rear side of cover 52 to couple the connection member 113*b* to the cover 52. Because, in this embodiment, the connection member 113*b* does not require access to it from the front side of the cover 52, the amount of space occupied by the brush box 105 is reduced which allows the cooling fins 152 to more closely approach the area around the brush box 105 and prevent stagnation of heat.

The tether assembly 120 is configured to deliver electrical power from an engine harness (not shown) to the brush box 105. As shown in FIGS. 3 and 4, the tether assembly 120 includes an end connector 121, a molded wire port 122, and a sheath housing 123. The sheath housing 123 encloses wires 124 that transmit electrical power though the tether assembly 120 to the brush box 105. One end of the sheath housing 123 is connected (e.g., clamped) to the end connector 121. The end connector 121 is configured to interface with the engine harness, which supplies power to the tether assembly 120. The other end of the sheath housing 123 is connected (e.g., clamped) to the molded wire port 122, which is configured to interface with the brush box 105. As shown in FIG. 7A, the molded wire port 122 provides a passage into the brush box 105, thus enabling the wires 124 to contact the brushes 106 in the brush box 105 to thereby supply power to the brushes 106.

The tether assembly 120 is preferably over-molded with a suitable material, such as a rubber or elastomer, in particular a material known by the brand name of Sanaprene, for weatherproofing. The over-molding can eliminate the need for tube shielding (such as the sheath housing 123) or other insulating material to be installed separately. In this manner, the tether assembly 120 is more robust and capable of withstanding a more rugged operating environment.

Figure 22:
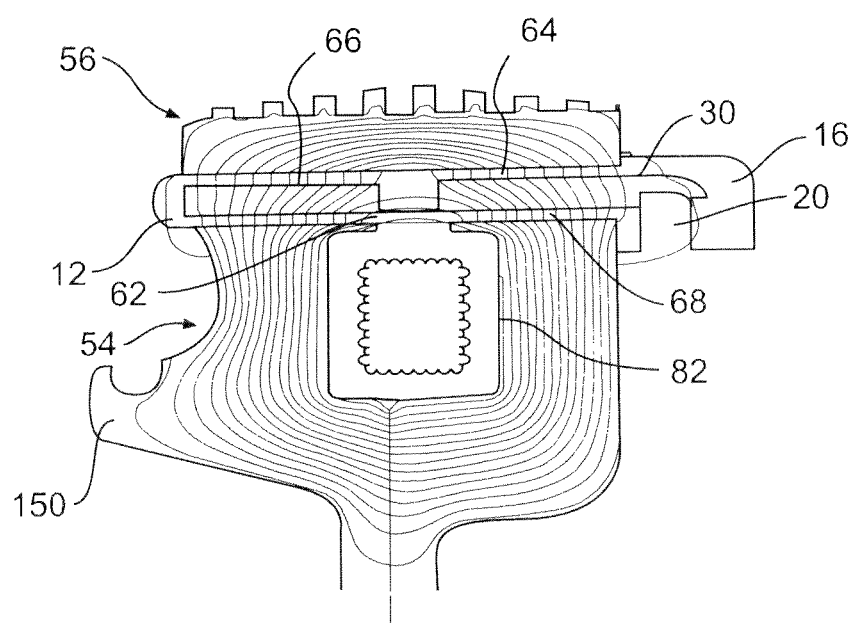
FIG. 22 is a schematic illustration showing the magnetic field generated by the coil assembly according to the present invention.

In operation, when electrical power is applied to the coil body 82 through the tether 120 and the brush box 105, a magnetic field illustrated in FIG. 22 forms in the gaps 62, 64 surrounding the rotor 30. The magnetic field causes the magnetic particles suspended in the MRF to align. The aligned particles restrict motion of the MRF, which increases the energy needed to yield the MRF thereby increasing the ability of the MRF to transfer torque from the rotor assembly 300 (i.e., the input shaft 10, the rotor hub 20, and the rotor 30) to the stator assembly 350 (i.e., the clutch housing assembly 40) to thereby drive the fan blade assembly 180 attached thereto.

Thus, the rotor assembly 300 rotates at an input speed determined by, for example, the engine or the water pump pulley ratio. As power is provided to the coil body 82, the formation of the magnetic field causes the yield stress of the magnetorheological fluid to increase. Torque is transferred between the rotor assembly 300 and the stator assembly 350 when the rotor 30 rotating in the slot 12 couples with the MRF and the wheel and ring portions 54, 56 couple with the MRF and begin to rotate.

A "lockup" condition between the rotor assembly 300 and the stator assembly 350, where the rotor assembly 300 and the stator assembly 350 rotate at the same speed, is possible. However, the MRF clutch 1 typically operates at a speed differential or ratio (also known as "slip") between the rotating speed of the rotor 30 and the rotating speed of the clutch housing assembly 40 and attached fan blade assembly 180. The degree of slip is controlled by controlling the magnetic field applied to the magnetorheological fluid. Thus, by controlling the power applied to the coil body 82, the strength of the magnetic field and the yield stress of the magnetorheological fluid is controlled. In this manner, the speed of the clutch housing assembly 40 and attached fan blade assembly 180 is virtually infinitely variable with respect to the speed of the input shaft 10.

Figure 9:
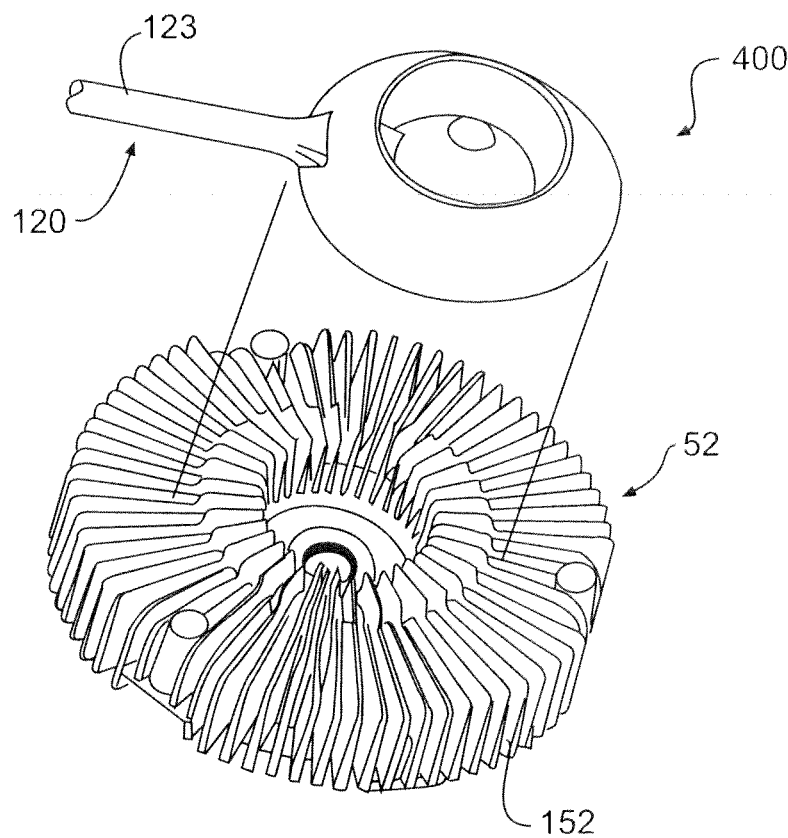
FIG. 9 is an exploded, perspective view of an embodiment of a cooling device installed on a clutch assembly according to the present invention.
Figure 10:
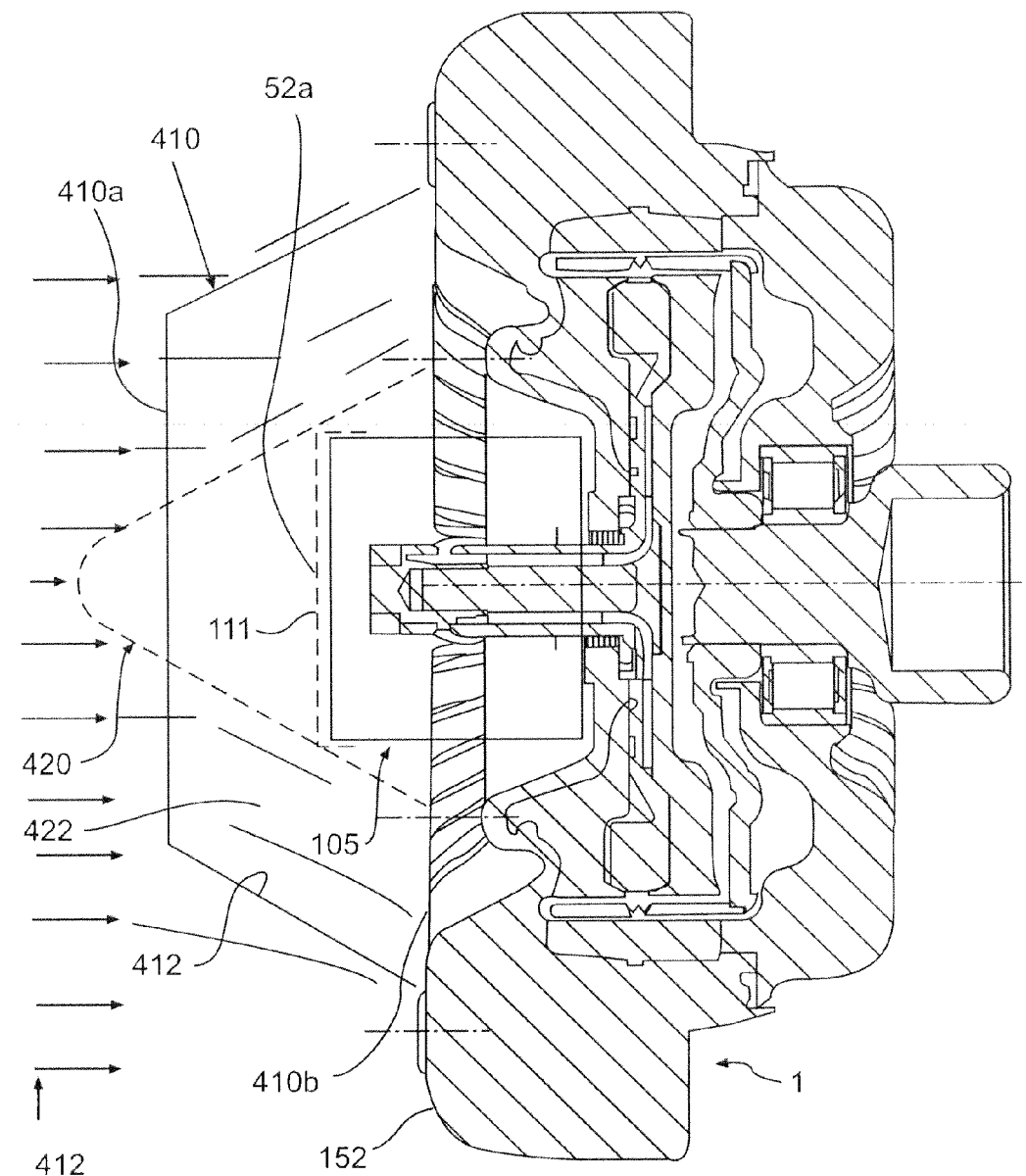
FIG. 10 is a cross sectional view of the cooling device and clutch assembly of FIG. 9 showing air flow through the cooling device.

As best shown in FIGS. 9 through 13, the MRF clutch 1 preferably includes a cooling device 400 configured to direct air flow F to increase heat dissipation performance of the cooling fins 152. As best shown in FIGS. 9 and 10, the cooling device 400 is installed on a front end 11*a* of the MRF clutch 1 and includes a diffuser element 410 and a connector element 420. The diffuser element 410 and the connector element 420 are configured to direct the air flow F toward the cooling fins 152, to increase air pressure, and to prevent stagnation of air at a central area 52*a* of the housing 52. As a result, the air flow F is directed into the cooling fins 152, and heat rejection within the clutch 1 is significantly improved.

Figure 11:
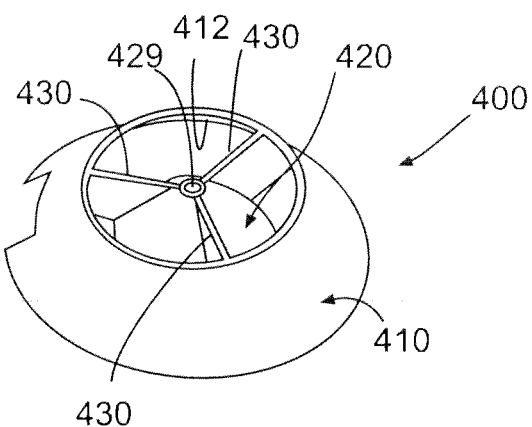
FIG. 11 is a perspective view of the cooling device of FIG. 9.
Figure 12:
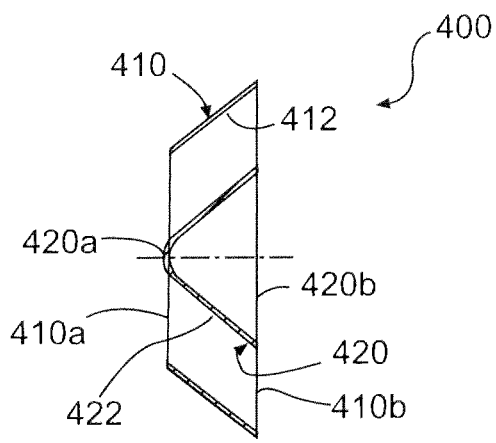
FIG. 12 is a cross sectional side view of the cooling device of FIG. 9.

The diffuser element 410 has a first surface 412 aligned to direct air toward the cooling fins 152. Preferably, the first surface 412 is a surface of a hollow, truncated cone, such as a frustum of a cone or a frustoconical section, as shown in FIGS. 11 and 12. When the MRF clutch 1 is installed in a vehicle, the cooling fins 152 face toward a front end of the vehicle. As the vehicle moves, air F flows toward the cooling fins 152, as best shown in FIG. 10. The air F enters a first opening 410*a* of the diffuser element 410 and is directed toward a second opening 410*b* proximate the cooling fins 152. The first surface 412 diverges from the first opening 410*a* toward the second opening 410*b*. Thus, the diffuser element 410 is designed so that a diameter of the second opening 410*b* is larger than a diameter of the first opening 410*a*. As the air F flows through the diverging diffuser element 410, air pressure increases and the first surface 412 directs (diffuses) air toward the cooling fins 152.

The connector element 420 is disposed concentrically within the diffuser element 410 and is configured to substantially reduce stagnation of air at the central area 52*a* of the fan cover body 52 (e.g., at an area in the vicinity of the cap 111 of the brush box 105). The connector element 420 preferably has a cone shaped surface to provide air flow through the diffuser element 410. As best shown in FIG. 10, the connector element 420 can be positioned over the brush box 105 so that the connector element 420 diverges in a direction toward the fan cover body 52. In other words, a small diameter end 420*a* of the connector element 420 is located away from the fan cover body 52, and a large diameter end 420*b* of the connector element 420 is located adjacent the fan cover body 52. As air flows through the diffuser element 410, the air flows along a diverging outer surface 422 of the connector element 420 rather than impinging and stagnating on the substantially flat cap 111 of the brush box 105. The connector element 420 is connected to the brush box 105, for example, by a press or interference fit or by sonic welding or staking. Alternatively, the connector element 420 can be made integral with the brush box 105.

Figure 13:
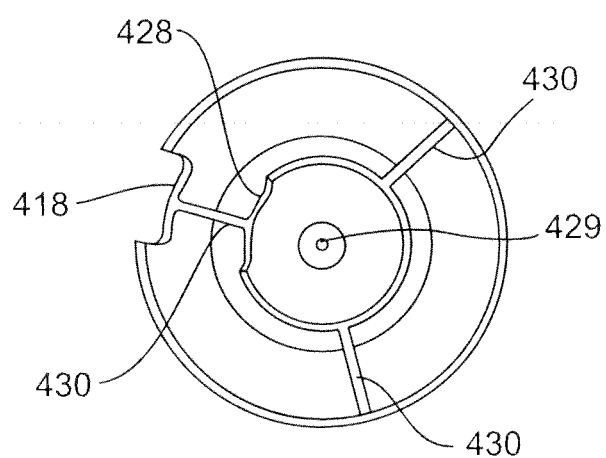
FIG. 13 is a bottom perspective view of the cooling device of FIG. 9.

As best shown in FIG. 11, the connector element 420 is connected to the diffuser element 410 by at least one extension member 430. Preferably, the connector element 420 includes three radially extending, angularly displaced extension members 430, as shown in FIG. 13. The extension members 430 can extend from an outer surface 422 of the connector element 420 to the first surface 412 of the diffuser element 410. Each extension member 430 can be disposed approximately 120 degrees from each other extension member 430. The diffuser element 410, the connector element 420, and the extension members 430 can be integrally formed and can be made of, for example, a polymeric material.

The diffuser element 410 and the connector element 420 also have apertures 418 and 428, respectively, as shown in FIG. 13. The apertures 418 and 428 enable the sheath housing 123 of the tether assembly 120 to pass through the diffuser element 410 and through the connector element 420 so that the tether 120 can connect to the brush box 105. Additionally, the cooling device 400 can be appropriately sized so that the cooling device 400 can be packaged in a particular vehicle between the MRF clutch 1 and a radiator.

Figure 14:
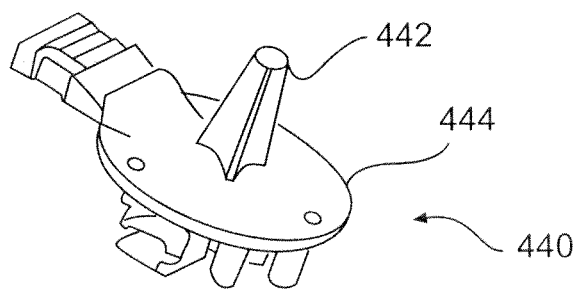
FIG. 14 is a perspective view of an attachment member for the cooling device shown in FIG. 9.

The cooling device 400 is configured to be connected to the fan cover body 52 via the brush box 105. For example, the cooling device 400 can be integral with the brush box 105. Alternatively, the cooling device 400 can include an attachment member 440 (shown in FIG. 14). The attachment member 440 is integrally formed in the brush box 105 and is adapted to connect the cooling device 400 to the fan cover body 52. The attachment member 440 can include a central projection 442 extending from a circular base 444 of the brush box 105. The central projection 442 can engage with a corresponding aperture 428 disposed on the connection member 420. For example, the connection member 420 can be mechanically or heat laser staked onto the central projection 442 or could be connected thereto in any other known or appropriate manner.

Figure 15:
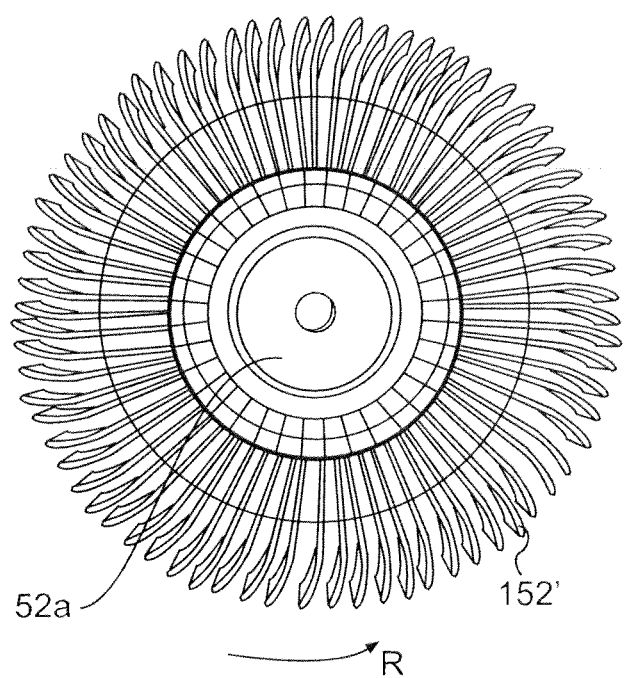
FIG. 15 is a front perspective view of cooling fins on a clutch assembly cover according to an embodiment of the present invention.

To further enhance heat dissipation, the fan cover body 52 can include curved cooling fins 152' (as shown in FIG. 15). The curved cooling fins 152' help reduce air flow separation along the walls of the cooling fins 152' thereby reducing stagnation of air along the cooling fins 152' to provide greater heat transfer from the cooling fins 152' to the air flowing past. The cooling fins 152' are curved in a direction opposite a direction of rotation R so that air moves in an outward direction with respect to the fan cover body 52 rather than inward toward the central area 52*a*.

The MRF clutch 1 can also be adapted to be driven by a combined MRF coolant pump and fan clutch drive device 500. The MRF drive device 500 is configured to drive the MRF clutch 1 (fan clutch) and a coolant pump (water pump) so that a speed of the MRF clutch 1 is independent of a speed of the water pump.

The MRF drive device 500 is configured to function as an MRF clutch for the water pump. The MRF drive device 500 includes a housing 510, a coil assembly 520, a rotor assembly 530, a water pump input shaft 540, and a fan clutch input shaft 10'.

The housing 510 includes a pulley 512 configured to be driven by the engine (e.g., by a drive belt driven by a crankshaft pulley) and a housing cover 514 connected to the pulley 512 by fasteners 505. The pulley 512 and the housing cover 514 form a reservoir 503 for containing a magnetorheological fluid. Additionally, the housing 510 includes a gasket (not illustrated) to substantially prevent leakage of the MRF out of the housing 510. The gasket is preferably a polymer o-ring or an RTV-FIP gasket. The pulley 512 can be stamped from a non-ferrous material, preferably aluminum. The housing cover 514 can be extruded from a non-ferrous material, preferably aluminum. Preferably, the pulley 512 includes cooling fins 515 to improve heat rejection from the MRF drive device 500 (e.g., by creating turbulent air flow in the vicinity of the cooling fins 515).

Figure 17:
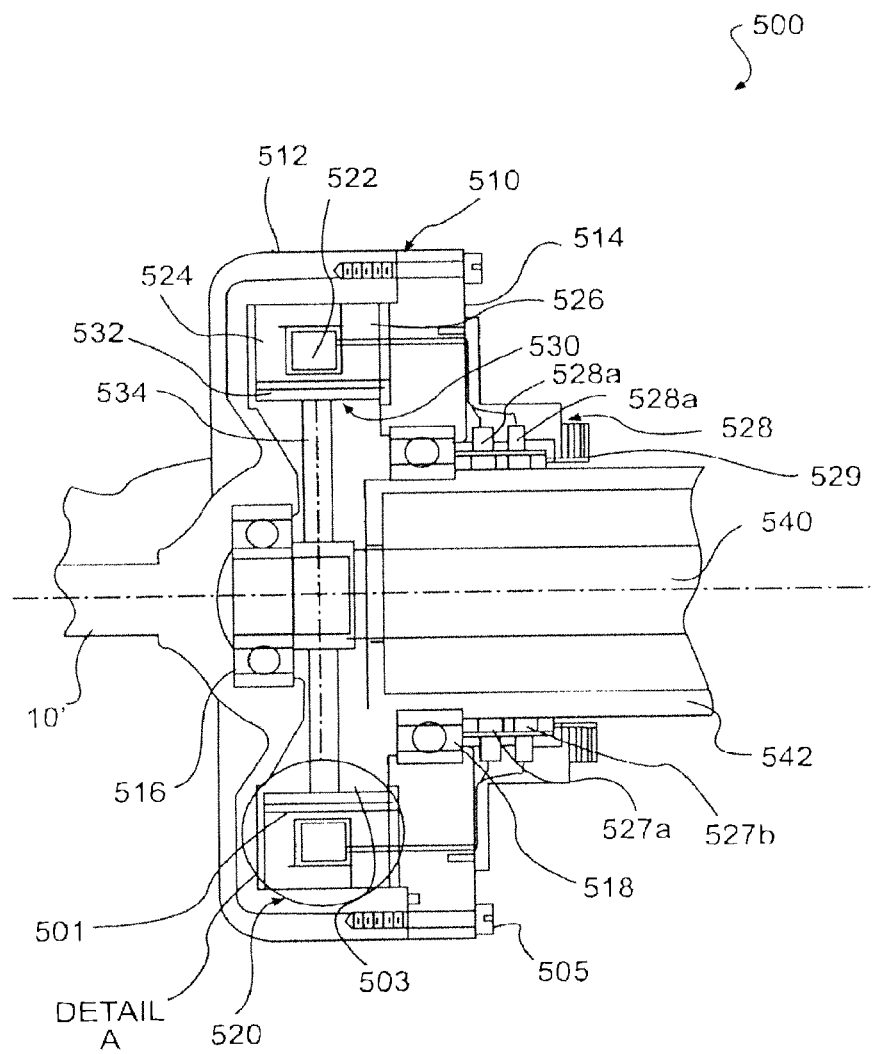
FIG. 17 is a cross sectional side elevation view of an embodiment of an MRF drive device according to the present invention.

As shown in FIG. 17, the pulley 512 is coupled to the fan clutch input shaft 10' (e.g., pressed or integrally formed) and is rotatably disposed on the water pump input shaft 540 via a bearing 516. The bearing 516 isolates the water pump input shaft 540 from the torque application by the pulley 512. The housing cover 514 is rotatably disposed on a stationary water pump housing 542 via a bearing 518. The bearings 516 and 518 allow for differential speed between the housing 510 and the water pump input shaft 540.

The coil assembly 520 is disposed within the housing 510, as shown in FIG. 17. The coil assembly 520 includes a coil body 522, a steel insert forging 524, and a steel insert ring 526. The coil body 522 is preferably press fit between the steel insert forging 524 and the steel insert ring 526. When the coil body 522 is energized by an electrical signal, the coil body 522 generates a magnetic field.

Power is supplied to the coil body 522 via brushes 528*a* contained in a brush holder assembly 528. The brush holder assembly 528 is connected to the housing cover 514, as shown in FIG. 17. The brushes 528*a* receive an electrical signal via slip rings 527*a* and 527*b* (e.g., a positive slip ring and a negative slip ring). The electrical signal is delivered to the slip rings 527*a*, 527*b* by an electrical connector 529 configured to be connected to the engine harness (not shown). The slip rings 527*a*, 527*b* and the electrical connector 529 are preferably fixed to the stationary water pump housing 542. Additionally, the brush holder assembly 528 preferably includes a Hall effect sensor to measure differential speed between the water pump shaft 540 and the clutch housing assembly 40 of the MRF clutch 1.

The rotor assembly 530 includes a rotor 532 and a rotor hub 534. The rotor 532 is disposed so that a gap 501 (working gap) exists between the rotor 532 and the coil assembly 520, as shown in FIG. 17. The rotor hub 534 rigidly connects the rotor 532 to the water pump input shaft 540. The rotor 532 is formed of a ferrous material, preferably low carbon steel, and the rotor hub 534 is formed of a non-ferrous material, preferably aluminum.

When electrical power is applied to the coil body 522, a magnetic field forms in the gap 501. The magnetic field causes the magnetic particles suspended in the MRF to align. The aligned particles restrict motion of the MRF, which increases the energy needed to yield the MRF thereby increasing the ability of the MRF to transfer torque. Thus, the rotor assembly 530 couples with the rotating coil assembly 520 (which rotates with the housing 510). In this manner, torque is transferred from the housing 510 to the rotor assembly 530 via the MRF to thereby drive the water pump input shaft 540 and an attached water pump. In this manner, coolant is circulated.

The water pump input shaft 540 is disposed within the water pump housing 542. The water input shaft 540 is preferably made of steel, and the water pump housing 542 is preferably made of aluminum. As described above, when the coil body 522 is energized, the water pump input shaft 540 couples the pulley 512 to the water pump (not shown) to thereby circulate coolant. By controlling the power applied to the coil body 522, the strength of the magnetic field generated by the coil body 522 and the yield stress of the MRF in the gap 501 and the reservoir 503 is controlled and varied. In this manner, the speed of water pump is virtually infinitely variable with respect to the speed of the pulley 512.

Similarly, the fan clutch input shaft 10' couples the pulley 512 to the MRF clutch 1. The input shaft 10' can be coupled with the MRF clutch as described above in connection with the input shaft 10. As explained above in connection with the operation of the MRF clutch 1, by controlling the power applied to the coil body 82, the strength of the magnetic field generated by the coil body 82 and the yield stress of the MRF in the gaps 62, 64 is controlled and varied. In this manner, the speed of the clutch housing assembly 40 and the attached fan blade assembly 180 is virtually infinitely variable with respect to the speed of the input shaft 10' (or the input shaft 10).

Thus, by controlling the respective electrical signals to the coil body 522 (water pump clutch) and to the coil body 82 (fan clutch), the water pump and the fan clutch can be driven by a common (shared) pulley 512 so that a speed of the fan clutch (and the fan blade assembly) is independent from a speed of the water pump. Moreover, the integral structure of the input shaft 10', the pulley 512, and the housing cover 514 eliminates the need for a typical headed and machined steel fan clutch shaft thereby providing weight, labor, and cost savings.

Figure 18:
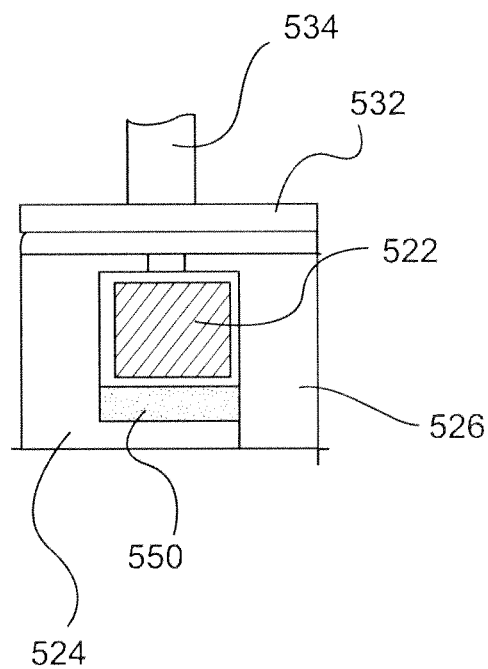
FIG. 18 is view of detail A of FIG. 17 including a permanent magnet.

Additionally, the MRF drive device 500 preferably includes a permanent annular magnet 550 disposed on the coil body 522, for example, as shown in FIG. 18. The permanent magnet 550 is preferably low carbon steel. The permanent magnet 550 is configured to perform a fail safe function by enabling the MRF drive device 500 to fail ON in the event power to the coil body 22 is cut off (e.g., due to an open circuit or catastrophic failure). The permanent magnet 550 generates a permanent magnetic field in the gap 501 and in the MRF surrounding the rotor 530. The permanent magnetic field is sufficient to provide a base threshold of MRF torque transfer. Thus, the water pump can be driven even if the coil body 522 is de-energized. In this manner, the engine is protected from overheating because coolant continues to flow even if power to the MRF drive device 500 is discontinued.

An MRF clutch according to the present invention can include all of the above-described the features, if desired. Alternatively, an MRF clutch according to the present invention can include any one of or any subset of the above-described features. Thus, embodiments according to the present invention contemplate all possible permutations and combinations of the above-described features. For example, an MRF clutch could include a subset of features including the grooved portion 36 on the rotor 30, the formed portion 28 on the rotor hub 20, and the roughened surfaces 210. Another subset of features could include the mounting pads 70, the contact pads 74, and the self-tapping fasteners 190'. Another subset of features could include the locking extension members 57 and 57', the complementary grooves 59 and 59', and the labyrinth seal path 54a formed between the housing insert 150 and the cover 52. Yet another subset of features could include the cooling element 400 and the curved fins 152'. Additional subsets include each of the above-described subsets with the MRF clutch being coupled to a water pump via the MRF drive device 500.

Thus, according to the embodiments described above, a more robust, manufacturable, and operable MRF clutch for a fan drive assembly is provided.

Modifications and other embodiments of the invention will be apparent to those skilled in the art from consideration of the specification and practice of the invention disclosed herein. It is intended that the specification and examples be considered as exemplary only, the scope of the invention being limited only by the appended claims.

What is claimed is:

1. A viscous fluid clutch comprising:
   an input shaft;
   a rotor assembly coupled to the input shaft;
   an annular housing insert;
   a housing including a first housing portion cast around the housing insert and a second housing portion connected for rotation with the first housing portion and rotatably disposed on the input shaft;
   a coil assembly including a coil body and a coil cover, the coil body having a head portion and a shaft portion perpendicular to the head portion, the shaft portion configured to receive at least one coil lead; and
   a seal compressed between the head portion of the coil body and the first housing portion about the shaft portion of the coil body, the seal abutting the head portion of the coil body and the first housing portion;
   wherein the coil cover is coupled to the housing insert; and
   wherein the coil cover contacts a portion of the coil body proximate the seal to substantially prevent the coil body from deflecting under the force applied to the coil body by the compressed seal.

2. The viscous fluid clutch of claim 1, wherein the housing insert is laser welded to the coil cover.

3. The viscous fluid clutch of claim 1, wherein one of the housing insert and the coil body includes an annular groove for receiving the seal.

4. The viscous fluid clutch of claim 1, wherein the seal is an o-ring.

5. The viscous fluid clutch of claim 1, further comprising a wheel portion of the housing insert, wherein when the coil cover is coupled to the housing insert, the wheel portion contacts a radial projection of the coil body at a first area of contact and the coil cover contacts the radial projection at a second area of contact.

6. The viscous fluid clutch of claim 5, wherein the first and second areas of contact form another seal between the wheel portion and the coil body and a third seal between the coil cover and the coil body.

7. The viscous fluid clutch of claim 1, wherein the seal is compressed between a central portion of the head portion of the coil body and a central portion of the first housing portion.

8. A viscous fluid clutch comprising:
an input shaft;
an annular housing insert;
a housing including a first housing portion engaged with a coil assembly and a second housing portion rotatably disposed on the input shaft, the first housing portion including a recess defined by a first radially extending surface and a first axially extending surface integrally formed with the first radially extending surface, the second housing portion including an extension configured to engage the recess in the first housing portion, the extension including a second radially extending surface and a second axially extending surface, one of the first axially extending surface and the second axially extending surface including an annular groove;
a seal disposed within the annular groove; and
a rotor assembly disposed between the first housing portion and the second housing portion and coupled to the input shaft;
wherein the first housing portion includes a first set of annular threads and the housing insert includes a second set of annular threads, the first set of annular threads configured to rotate in a direction of engagement with the second set of annular threads, and
wherein when the first housing portion is coupled to the second housing portion, the first radially extending surface makes line-to-line contact with the second radially extending surface and the seal is compressed between the first axially extending surface and the second axially extending surface.

9. The viscous fluid clutch of claim 8, wherein the first housing portion includes an annular projection configured to maintain the coupled condition of the first housing portion and the second housing portion when the first and second housing portions are rotated.

10. The viscous fluid clutch of claim 8, wherein the volume of space between the first radially extending surface, the first axially extending surface, the second radially extending surface, and the second axially extending surface is minimized.

11. The viscous fluid clutch of claim 8, wherein the seal is a static o-ring.

12. The viscous fluid clutch of claim 8, wherein the seal is a polymeric sealant.

13. The viscous fluid clutch of claim 8, wherein the housing insert comprises a ring portion, and wherein the first set of annular threads and the second set of annular threads are configured to mechanically engage the ring portion of the housing insert and the first housing portion such that a movement of the ring portion relative to the first housing portion causes the ring portion to be more securely threaded with the first housing portion.

* * * * *